United States Patent [19]
Meron et al.

[11] Patent Number: 6,167,317
[45] Date of Patent: Dec. 26, 2000

[54] APPARATUS AND METHODS FOR MANAGEMENT OF FLOCKS OF LAYER FOWL

[75] Inventors: Uri Meron; Asaf Barut; Gilad Rafaeli, all of Kibbutz Givat Haim Ichud; Uri Yankovitz, Katzir; David Zvilichovsky, Ramat Hasharon; Rami Cahalon, Netanya, all of Israel

[73] Assignee: M.G.H. Agricultural Cooperative Society Ltd., Givat Haim Ichud, Israel

[21] Appl. No.: 09/012,694

[22] Filed: Jan. 23, 1998

[30] Foreign Application Priority Data

Jan. 20, 1998 [IL] Israel ............................. 123007

[51] Int. Cl.[7] .......................... G06F 19/00; G05B 13/02; A01K 45/00
[52] U.S. Cl. ........................ 700/32; 700/108; 119/174; 119/50; 119/6.8; 119/437
[58] Field of Search ................... 700/32, 108; 119/48, 119/50, 6.8, 174, 329, 345, 439, 440, 437

[56] References Cited

U.S. PATENT DOCUMENTS

| | | | |
|---|---|---|---|
| 4,188,911 | 2/1980 | Rafaely | 119/48 |
| 4,230,071 | 10/1980 | Phillips | 119/440 |
| 4,331,103 | 5/1982 | Kuhlmann | 119/174 |
| 4,889,076 | 12/1989 | Cohen | 119/50 |
| 5,125,362 | 6/1992 | Erickson et al. | 119/329 |
| 5,901,662 | 5/1999 | Menache | 119/336 |

FOREIGN PATENT DOCUMENTS

WO96/35327  11/1996  WIPO .

OTHER PUBLICATIONS

M.G.H. Agricultural Cooperation Society Ltd. "Automated Egg Collection System for Turkey Breeders", Fourth Edition 1996, Updated Jan. 1998.

Brochure: M.G.H. "Automated Nesting System for Turkeys", M.G.H. Automation Systems, Kibbutz Givat Haim Ichud, Israel 38935.

Primary Examiner—William Grant
Assistant Examiner—Ivan Calcano
Attorney, Agent, or Firm—Mark M. Friedman

[57] ABSTRACT

A layer flock management system including a layer information accumulator operative to accumulate information regarding each of a multiplicity of layers in a flock and a floor layer identifier operative to identify floor layers from among the multiplicity of layers.

13 Claims, 41 Drawing Sheets

Microfiche Appendix Included
(5 Microfiche, 436 Pages)

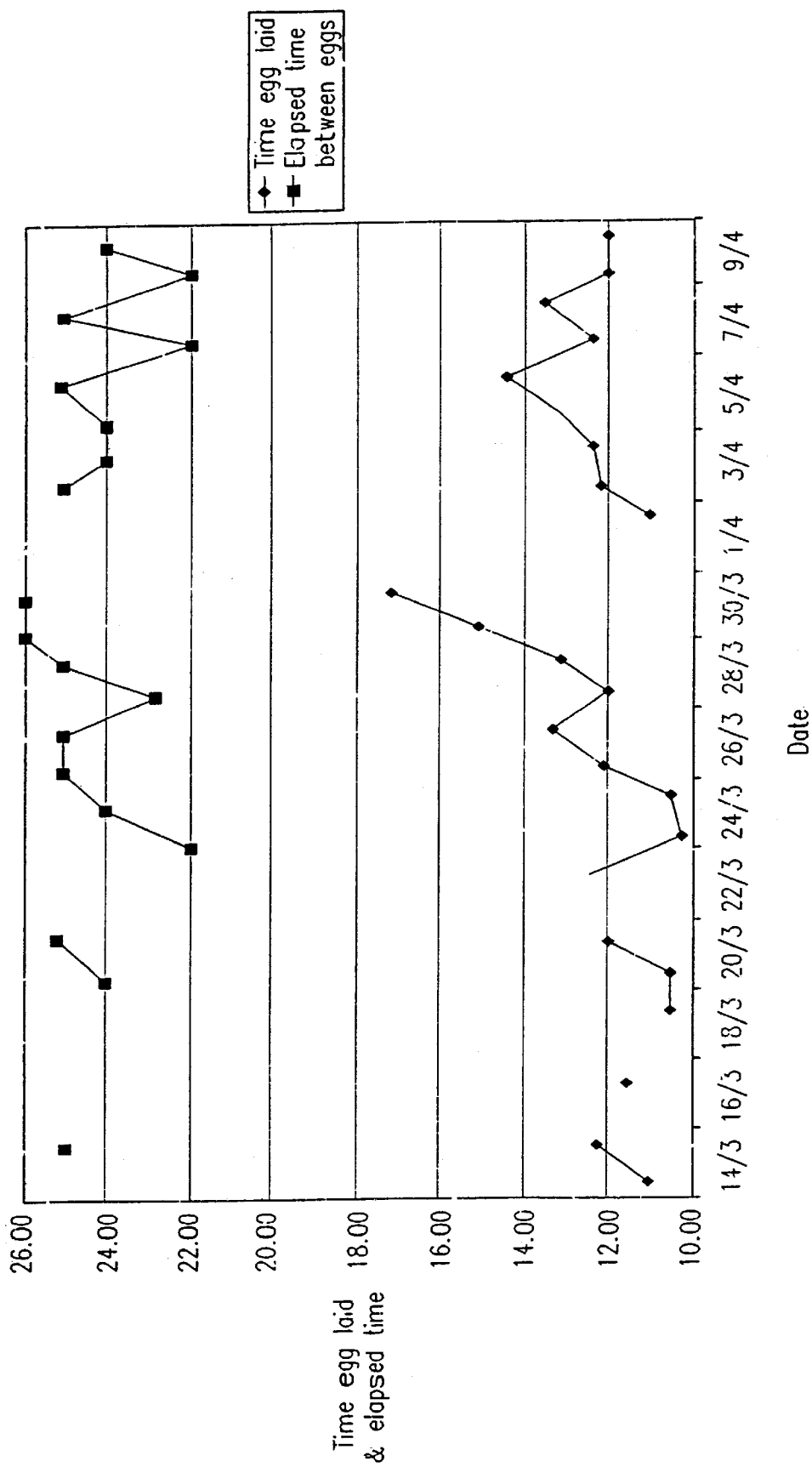

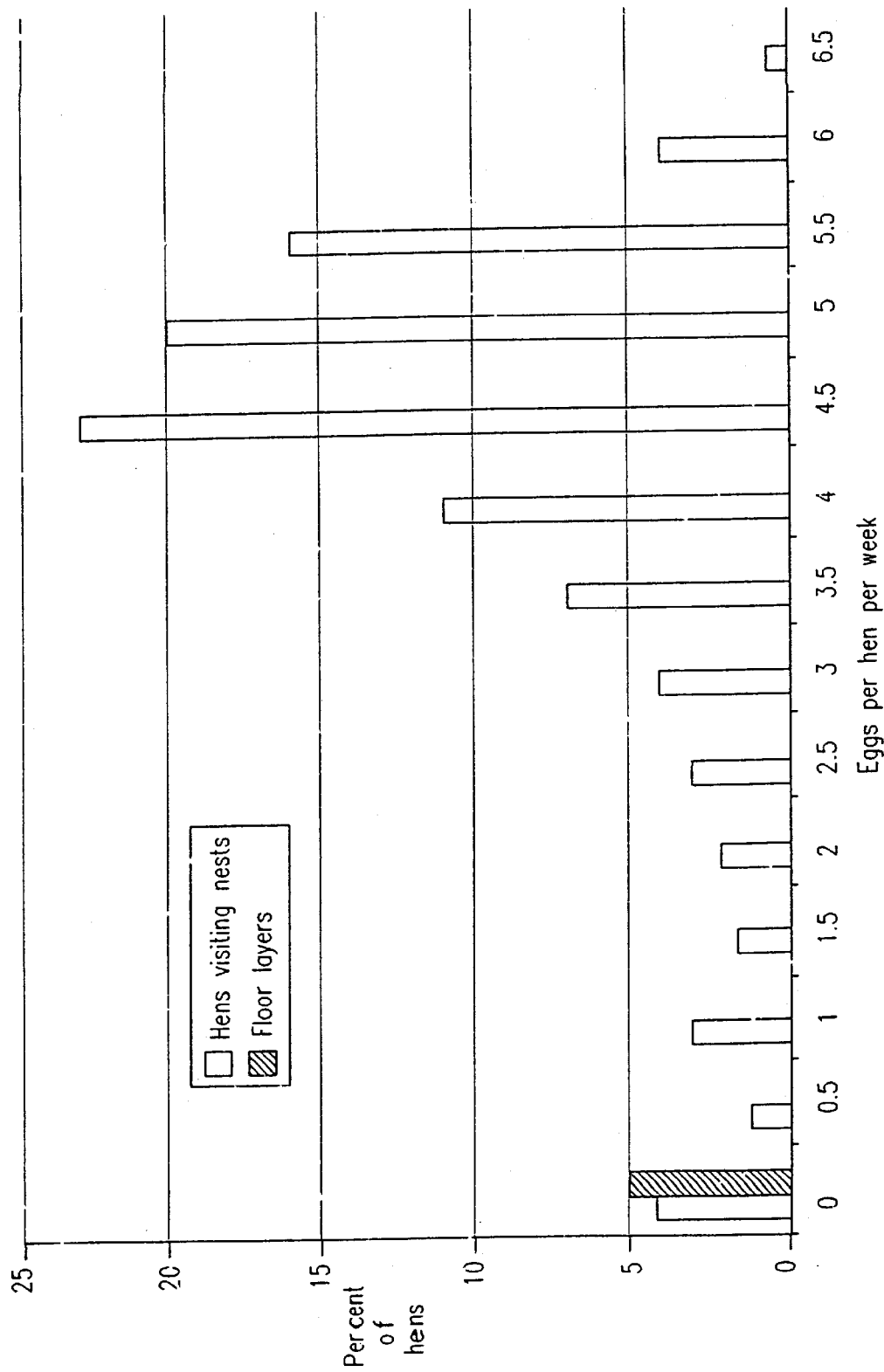

FIG. 23

| | | | |
|---|---|---|---|
| | • 19 | GND • | |
| | • 18 | 37 • | |
| | • 17 | 36 • | |
| | • 16 | 35 • | |
| | • 15 | 34 • | |
| | • 14 | 33 • | |
| | • 13 | 32 • | |
| | • 12 | 31 • | |
| | • 11 | 30 • | |
| | • 10 | 29 • | |
| | • 9 | 28 • | |
| | • 8 | 27 • | |
| | • 7 | 26 • | |
| | • 6 | 25 • | |
| | • 5 | 24 • | |
| | • 4 | 23 • | |
| COM 2\OUT 2 | • 3 | 22 • | COM 2\OUT 3 |
| COM 1\OUT 3 | • 2 | 21 • | COM 2\OUT 1 |
| COM 1\OUT 1 | • 1 | 20 • | COM 2\OUT 2 |

FIG. 27

| FMS FLOCK PLANNER | | | | | | | |
|---|---|---|---|---|---|---|---|
| | Company Name: | Try 1 | | | | | |
| | | | | | | | |
| Production life cycle for FMS flock | | | | | | | |
| | | 1st Cycle | Extension | Dark house | Clean-out | Recycle | |
| Minimum number of weeks | | 26 | 6 | 10 | 3 | 20 | |
| Maximum number of weeks | | 32 | 10 | 11 | 8 | 27 | |
| | | | | | | | |
| 1st Lay + Extension. Max number of weeks | | | 38 | | | | |
| | | | | | | | |
| Non-FMS regular laying period | | 28 | 10 | Cost of hen | | 15 | |
| Non-FMS clean out time | | 4 | | Price per egg | | 0.65 | |
| | | | | Salvage price per hen | | 2 | |
| | | | | | | | |
| Lighting period | | | | Week no. for beginning comparison | | 1 | |
| Flock Planner no. of weeks? | | | 190 | No. of weeks for comparison | | 52 | |
| | | | | | | | |
| Weekly cost per hen | | | | Details of Farms | | | |
| | Dark house | Laying period | Clean-out | Name | | | One |
| Feed | 0.25 | 0.34 | | Number of nests | | | 27 |
| AI | | 0.3 | | Quantity of hens | | | 10000 |
| Labor | 0.1 | 0.34 | | Number of rows | | | 0 |
| Overheads | | 0.13 | | Entry date next flock | | | 1/9/97 |
| Other expenses | | 0.3 | | Farms fitted with FMS nests? | | | yes |
| | | | | | | | |
| | | | | Name | | | Two |
| | | | | Number of nests | | | |
| | | | | Quantity of hens | | | 9500 |
| | | | | Number of rows | | | 0 |
| | | | | Entry date next flock | | | 8/9/97 |
| | | | | Farms fitted with FMS nests? | | | yes |
| | | | | | | | |
| | | | | Name | | | Three |
| | | | | Number of nests | | | |
| | | | | Quantity of hens | | | 10500 |
| | | | | Number of rows | | | 0 |
| | | | | Entry date next flock | | | 15/9/97 |
| | | | | Farms fitted with FMS nests? | | | yes |

FIG. 28

| | | | | | Name | | Four |
|---|---|---|---|---|---|---|---|
| | | | | | Number of nests | | |
| | | | | | Quantity of hens | | 3900 |
| | | | | | Number of rows | | 0 |
| | | | | | Entry date next flock | | 22/9/97 |
| | | | | | Fitted with FMS nests? | | yes |
| | | | | | Name | | Five |
| | | | | | Number of nests | | |
| | | | | | Quantity of hens | | 10000 |
| | | | | | Number of rows | | 0 |
| | | | | | Entry date next flock | | 29/9/97 |
| | | | | | Fitted with FMS nests? | | no |
| | | | | | Name | | Six |
| | | | | | Number of nests | | |
| | | | | | Quantity of hens | | 10200 |
| | | | | | Number of rows | | 0 |
| | | | | | Entry date next flock | | 8/9/97 |
| | | | | | Fitted with FMS nests? | | no |
| | | | | | Name | | Seven |
| | | | | | Number of nests | | |
| | | | | | Quantity of hens | | 9000 |
| | | | | | Number of rows | | 0 |
| | | | | | Entry date next flock | | 8/9/97 |
| | | | | | Fitted with FMS nests? | | yes |
| | | | | | Name | | Eight |
| | | | | | Number of nests | | |
| | | | | | Quantity of hens | | 11000 |
| | | | | | Number of rows | | 0 |
| | | | | | Entry date next flock | | 8/9/97 |
| | | | | | Fitted with FMS nests? | | yes |

FIG. 29

|  |  |  |  |  | Name | | Nine |
|---|---|---|---|---|---|---|---|
|  |  |  |  |  | Number of nests | | |
|  |  |  |  |  | Quantity of hens | | 10200 |
|  |  |  |  |  | Number of rows | | 0 |
|  |  |  |  |  | Entry date next flock | | 27/10/97 |
|  |  |  |  |  | Fitted with FMS nests? | | no |
|  |  |  |  |  |  | | |
|  |  |  |  |  | Name | | Ten |
|  |  |  |  |  | Number of nests | | |
|  |  |  |  |  | Quantity of hens | | 1000 |
|  |  |  |  |  | Number of rows | | 0 |
|  |  |  |  |  | Entry date next flock | | 15/9/97 |
|  |  |  |  |  | Fitted with FMS nests? | | yes |
|  |  |  |  |  |  | | |
|  |  |  |  |  | Name | | Eight |
|  |  |  |  |  | Number of nests | | |
|  |  |  |  |  | Quantity of hens | | 11000 |
|  |  |  |  |  | Number of rows | | 0 |
|  |  |  |  |  | Entry date next flock | | 8/9/97 |
|  |  |  |  |  | Fitted with FMS nests? | | yes |

FIG. 30

TABLE 1.
SIMULATION TO DETERMINE THE ECONOMIC IMPACT OF USING COMMERCIAL FINAL PRODUCT HENS
AS PARENT STOCK IN A VERTICALLY INTEGRATED TURKEY OPERATION

ECONOMIC VALUES ESTIMATED USING DIAMOND K/HYBRID TURKEYS SIMUALTION MODEL

| GENOTYPES ---> | Male Line | Paternal Female Line | Maternal Female Line | Normal PS Hen | Normal Commercial | Super Commercial |
|---|---|---|---|---|---|---|
| SIRE STATS | [AXA] | [CXC] | [DXD] | [CXC] | [AXA] | [AXA] |
| Sire's body weight at: | | | | | | |
| 14 weeks of age | 25.52 | 22.40 | 19.47 | 22.40 | 25.52 | 25.52 |
| 18 weeks of age | 36.94 | 32.39 | 28.15 | 32.39 | 36.94 | 36.94 |
| 30 weeks of age | 61.38 | 53.78 | 46.75 | 53.78 | 61.38 | 61.38 |
| Sire's feed conversion at: | | | | | | |
| 14 weeks of age | 2.206 | 2.288 | 2.370 | 2.327 | 2.206 | 2.206 |
| 18 weeks of age | 2.520 | 2.611 | 2.705 | 2.656 | 2.520 | 2.520 |
| 30 weeks of age | 3.930 | 4.067 | 4.212 | 4.137 | 3.930 | 3.930 |
| DAM STATS | [AXA] | [CXC] | [DXD] | [DXD] | [CXD] | [(AXA)X(CXD)] |
| Dam's body weight at: | | | | | | |
| 14 weeks of age | 19.41 | 15.46 | 11.39 | 11.39 | 13.18 | 16.27 |
| 18 weeks of age | 26.26 | 20.88 | 15.39 | 15.39 | 17.80 | 21.98 |
| 30 weeks of age | 38.28 | 30.40 | 22.40 | 22.40 | 25.92 | 32.00 |
| Dam's feed conversion at: | | | | | | |
| 14 weeks of age | 2.145 | 2.290 | 2.472 | 2.472 | 2.384 | 2.261 |
| 18 weeks of age | 2.533 | 2.700 | 2.914 | 2.914 | 2.809 | 2.665 |
| 30 weeks of age | 4.240 | 4.506 | 4.864 | 4.864 | 4.689 | 4.449 |
| Dam's reproductive performance: | | | | | | |
| % Hen housed egg production | 31.7% | 47.6% | 59.5% | 65.5% | 53.6% | 42.6% |
| Days of egg production | 126 | 168 | 168 | 168 | 168 | 140 |
| Eggs per hen housed | 40.0 | 80.0 | 100.0 | 100.0 | 90.0 | 59.7 |
| Percent cull eggs | 7.00% | 6.00% | 4.00% | 4.00% | 5.00% | 6.0% |
| %Hatch of total eggs (saleable poults) | 69.00% | 77.00% | 83.00% | 83.00% | 79.00% | 74.0% |
| BREEDER POULT COST | | | | | | |
| Males | | | | | $9.00 | $9.00 |
| Females | | | | | $5.90 | $0.5103 |
| PROGENY GENOTYPE | [AXA] | [CXC] | [DXD] | [CXD] | [(AXA)]X[(CXD)] | [(AXA)X(AXA)]X[(AXA)X(CXD)] |
| Progeny straight run poult cost | | | | | $1.0207 | $1.5649 |
| Poult value ratio males:females | | | | | 1.5 | 1.5 |
| Tom poult value | | | | | $1.5310 | $2.3473 |
| Hen poult value | | | | | $0.5103 | $0.7824 |

FIG. 31

| | | | | | | |
|---|---|---|---|---|---|---|
| PROGENY GROWTH PERFORMANCE | | | | | | |
| Hens at 14 weeks | 19.41 | 15.46 | 11.39 | 13.18 | 16.27 | 17.84 |
| FCR | 2.138 | 2.138 | 2.138 | 2.138 | 2.138 | 2.138 |
| Toms at 18 weeks | 36.94 | 32.39 | 28.15 | 30.27 | 33.64 | 35.29 |
| FCR | 2.520 | 2.608 | 2.701 | 2.653 | 2.584 | 2.552 |
| PROGENY PROCESSING STATISTICS | | | | | | |
| Males at 18 weeks: | | | | | | |
| % Field condemnations | 1.75% | 1.50% | 1.00% | 1.25% | 1.50% | 1.63% |
| % Plant condemnations | 2.75% | 1.75% | 1.25% | 1.50% | 2.13% | 2.44% |
| %CWOG | 82.00% | 79.00% | 78.00% | 78.50% | 80.25% | 81.13% |
| % Boneless skinless breast meat | 25.00% | 23.00% | 21.00% | 22.00% | 23.50% | 24.25% |
| %Fillet | 6.00% | 6.00% | 6.00% | 6.00% | 6.00% | 6.00% |
| %Whole drums | 13.00% | 14.00% | 14.00% | 14.00% | 13.50% | 13.25% |
| %Boneless skinless thigh meat | 14.00% | 15.00% | 15.00% | 15.00% | 14.50% | 14.25% |
| %Whole wings | 11.00% | 10.75% | 10.25% | 10.50% | 10.75% | 10.88% |
| Females at 14 weeks: | | | | | | |
| % Field condemnations | 1.00% | 0.75% | 0.50% | 0.63% | 0.81% | 0.91% |
| % Plant condemnations | 1.75% | 1.25% | 1.00% | 1.13% | 1.44% | 1.59% |
| %CWOG | 83.00% | 82.00% | 78.00% | 80.00% | 81.50% | 82.25% |
| % Boneless skinless breast meat | 24.00% | 23.00% | 21.00% | 22.00% | 23.00% | 23.50% |
| %Fillet | 5.50% | 5.00% | 4.50% | 6.50% | 6.00% | 5.75% |
| %Whole drums | 14.00% | 12.00% | 13.00% | 12.50% | 13.25% | 13.63% |
| %Boneless skinless thigh meat | 14.50% | 15.00% | 16.00% | 15.50% | 15.00% | 14.75% |
| %Whole wings | 12.00% | 11.80% | 12.00% | 11.40% | 11.70% | 11.85% |
| ECONOMICS: | | | | | | |
| Live cost $/good live pound TOMS | | | | | $0.4774 | $0.4995 |
| HENS | | | | | $0.4286 | $0.4454 |
| Gross margin, $/live pound through cut up TOMS | | | | | $0.0810 | $0.0876 |
| HENS | | | | | $0.0415 | $0.0654 |

FIG. 32
| Dam of "Super Commercial" | NET MARGIN $/LIVE POUND | |
|---|---|---|
| EGGS/HEN HOUSED | TOMS | HENS |
| 59.7 | $ 0.0876 | $ 0.0654 |
| 60.0 | $ 0.0880 | $ 0.0657 |
| 62.0 | $ 0.0902 | $ 0.0670 |
| 64.0 | $ 0.0923 | $ 0.0683 |
| 66.0 | $ 0.0943 | $ 0.0696 |
| 68.0 | $ 0.0961 | $ 0.0707 |
| 70.0 | $ 0.0979 | $ 0.0718 |
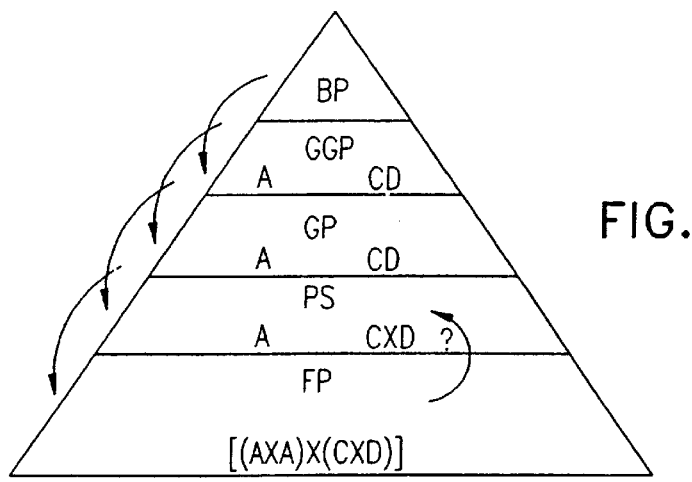
FIG. 33
FIG. 34
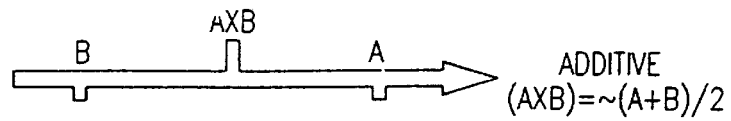
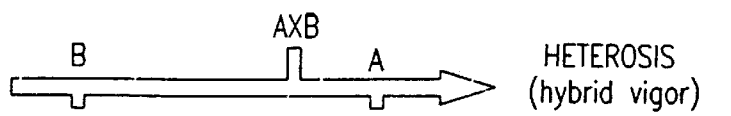
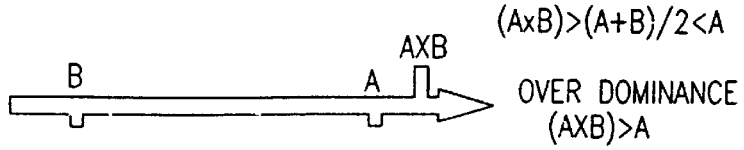

| Production life cycle for FMS flock | | | | | |
|---|---|---|---|---|---|
| 1st Cycle | Extension | Dark house | Clean-out | ReCycle |
| 26 | 8 | 10 | 3 | 20 |
| 32 | 12 | 11 | 6 | 27 |

Minimum number of weeks
Maximum number of weeks
1st Lay+Extension Max Number of weeks: 38

Non-FMS regular laying ?????: 26
Non-FMSclean uot: 4

Cost of hen: 15
Price per egg: 65
Sale Old hEN ?????: 2

[0]

Week number for begining comparison: 45
Number of weeks for comparison: 52

Lighting period: 2
Planning for weeks: 156

| | | FMS FLOCK PLANNER | | | |
|---|---|---|---|---|---|
| | | Company Name: | Simulation | | |
| | | | | | |
| | Weekly Cost Per Hen | | Details of Farms | | |
| | Dark house | Laying period | Clean-out | Name | | al |
| Feed | 0.25 | 0.34 | | Number of nests | | |
| A.I. | | 0.3 | | Quantity of hens | | 9500 |
| Labor | 0 1 | 0.34 | | Number of rows | | 0 |
| Overheads | | 0.3 | | Entry date next flock | | 1/9/97 |
| Other expenses | | 0.13 | | Fitted with FMS nests? | | yes |
| | | | | | | |
| | | | | Name | | el |
| | | | | Number of nests | | |
| | | | | Quantity of hens | | 10000 |
| | | | | Number of rows | | 0 |
| | | | | Entry date next flock | | 29/9/97 |
| | | | | Fitted with FMS nests? | | no |
| | | | | | | |
| | | | | Name | | dl |
| | | | | No. nests | | |
| | | | | Quantity of hens | | 10000 |
| | | | | Number of rows | | 0 |
| | | | | Entry date next flock | | 22/09/97 |
| | | | | Fitted with FMS nests? | | no |
| | | | | | | |
| | | | | Name | | cl |
| | | | | Number of nests | | |
| | | | | Quantity of hens | | 10000 |
| | | | | Number of rows | | 0 |
| | | | | Entry date next flock | | 15/09/97 |
| | | | | Fitted with FMS nests? | | yes |

FIG. 39B

|  |  |  |  | Name |  | bl |
|---|---|---|---|---|---|---|
|  |  |  |  | Number of nests |  |  |
|  |  |  |  | Quantity of hens |  | 10000 |
|  |  |  |  | Number of rows |  | 0 |
|  |  |  |  | Entry date next flock |  | 8/9/97 |
|  |  |  |  | Fitted with FMS nests? |  | yes |

FIG. 40

| | | a1 | | | b1 | | | c1 | | | d1 | | | e1 | | |
|---|---|---|---|---|---|---|---|---|---|---|---|---|---|---|---|---|
| Fms | WeeksDa | 1 | 2 | 3 | 4 | 5 | 6 | 7 | 8 | 9 | 10 | 11 | 12 | 13 | 14 | 15 |
| 1 | 1/9/97 | N | 0 | 0 | N | 0 | 0 | N | 0 | 0 | N | 0 | 0 | N | 0 | 0 |
| 2 | 8/9/97 | N | 0 | 0 | N | 0 | 0 | N | 0 | 0 | N | 0 | 0 | N | 0 | 0 |
| 3 | 15/9/97 | N | 0 | 0 | N | 0 | 0 | N | 0 | 0 | N | 0 | 0 | N | 0 | 0 |
| 4 | 22/9/97 | N | 0 | 0 | N | 0 | 0 | N | 0 | 0 | N | 0 | 0 | N | 0 | 0 |
| 5 | 29/9/97 | N | 0 | 0 | N | 0 | 0 | N | 0 | 0 | N | 0 | 0 | N | 0 | 0 |
| 6 | 6/10/97 | N | 0 | 0 | N | 0 | 0 | N | 0 | 0 | N | 0 | 0 | N | 0 | 0 |
| 7 | 13/10/97 | N | 0 | 0 | N | 0 | 0 | N | 0 | 0 | N | 0 | 0 | N | 0 | 0 |
| 8 | 20/10/97 | N | 0 | 0 | N | 0 | 0 | N | 0 | 0 | N | 0 | 0 | N | 0 | 0 |
| 9 | 27/10/97 | N | 0 | 0 | N | 0 | 0 | N | 0 | 0 | N | 0 | 0 | N | 0 | 0 |
| 10 | 3/11/97 | N | 0 | 0 | N | 0 | 0 | N | 0 | 0 | N | 0 | 0 | N | 0 | 0 |
| 11 | 10/11/97 | N | 0 | 0 | N | 0 | 0 | N | 0 | 0 | N | 0 | 0 | N | 0 | 0 |
| 12 | 17/11/97 | N | 0 | 0 | N | 0 | 0 | N | 0 | 0 | N | 0 | 0 | N | 0 | 0 |
| 13 | 24/11/97 | N | 0 | 0 | N | 0 | 0 | N | 0 | 0 | N | 0 | 0 | N | 0 | 0 |
| 14 | 1/12/97 | N | 0 | 0 | N | 0 | 0 | N | 0 | 0 | N | 0 | 0 | N | 0 | 0 |
| 15 | 8/12/97 | N | 0 | 0 | N | 0 | 0 | N | 0 | 0 | N | 0 | 0 | N | 0 | 0 |
| 16 | 15/12/97 | N | 0 | 0 | N | 0 | 0 | N | 0 | 0 | N | 0 | 0 | N | 0 | 0 |
| 17 | 22/12/97 | N | 0 | 0 | N | 0 | 0 | N | 0 | 0 | N | 0 | 0 | N | 0 | 0 |
| 18 | 29/12/97 | N | 0 | 0 | N | 0 | 0 | N | 0 | 0 | N | 0 | 0 | N | 0 | 0 |
| 19 | 5/1/98 | N | 0 | 0 | N | 0 | 0 | N | 0 | 0 | N | 0 | 0 | N | 0 | 0 |
| 20 | 12/1/98 | N | 0 | 0 | N | 0 | 0 | N | 0 | 0 | N | 0 | 0 | N | 0 | 0 |
| 21 | 19/1/98 | N | 0 | 0 | N | 0 | 0 | N | 0 | 0 | N | 0 | 0 | N | 0 | 0 |
| 22 | 26/1/98 | N | 0 | 0 | N | 0 | 0 | N | 0 | 0 | N | 0 | 0 | N | 0 | 0 |
| 23 | 2/2/98 | N | 0 | 0 | N | 0 | 0 | N | 0 | 0 | N | 0 | 0 | N | 0 | 0 |
| 24 | 9/2/98 | N | 0 | 0 | N | 0 | 0 | N | 0 | 0 | N | 0 | 0 | N | 0 | 0 |
| 25 | 16/2/98 | N | 0 | 0 | N | 0 | 0 | N | 0 | 0 | N | 0 | 0 | N | 0 | 0 |
| 26 | 23/2/98 | N | 0 | 0 | N | 0 | 0 | N | 0 | 0 | N | 0 | 0 | N | 0 | 0 |
| 27 | 2/3/98 | N | 0 | 0 | N | 0 | 0 | N | 0 | 0 | N | 0 | 0 | N | 0 | 0 |
| 28 | 9/3/98 | N | 0 | 0 | N | 0 | 0 | N | 0 | 0 | N | 0 | 0 | N | 0 | 0 |
| 29 | 16/3/98 | N | 0 | 0 | N | 0 | 0 | N | 0 | 0 | N | 0 | 0 | N | 0 | 0 |
| 30 | 23/3/98 | N | 0 | 0 | N | 0 | 0 | N | 0 | 0 | N | 0 | 0 | N | 0 | 0 |
| 31 | 30/3/98 | N | 0 | 0 | N | 0 | 0 | N | 0 | 0 | N | 0 | 0 | N | 0 | 0 |
| 32 | 6/4/98 | N | 0 | 0 | N | 0 | 0 | N | 0 | 0 | N | 0 | 0 | N | 0 | 0 |
| 33 | 13/4/98 | N | 0 | 0 | N | 0 | 0 | N | 0 | 0 | N | 0 | 0 | N | 0 | 0 |
| 34 | 20/4/98 | N | 0 | 0 | N | 0 | 0 | N | 0 | 0 | N | 0 | 0 | N | 0 | 0 |
| 35 | 27/4/98 | N | 0 | 0 | N | 0 | 0 | N | 0 | 0 | N | 0 | 0 | N | 0 | 0 |
| 36 | 4/5/98 | N | 0 | 0 | N | 0 | 0 | N | 0 | 0 | N | 0 | 0 | N | 0 | 0 |
| 37 | 11/5/98 | N | 0 | 0 | N | 0 | 0 | N | 0 | 0 | N | 0 | 0 | N | 0 | 0 |
| 38 | 18/5/98 | N | 0 | 0 | N | 0 | 0 | N | 0 | 0 | N | 0 | 0 | N | 0 | 0 |
| 39 | 25/5/98 | N | 0 | 0 | N | 0 | 0 | N | 0 | 0 | N | 0 | 0 | N | 0 | 0 |
| 40 | 1/6/98 | N | 0 | 0 | N | 0 | 0 | N | 0 | 0 | N | 0 | 0 | N | 0 | 0 |
| 41 | 8/6/98 | N | 0 | 0 | N | 0 | 0 | N | 0 | 0 | N | 0 | 0 | N | 0 | 0 |
| 42 | 15/6/98 | N | 0 | 0 | N | 0 | 0 | N | 0 | 0 | N | 0 | 0 | N | 0 | 0 |
| 43 | 22/6/98 | N | 0 | 0 | N | 0 | 0 | N | 0 | 0 | N | 0 | 0 | N | 0 | 0 |
| 44 | 29/6/98 | N | 0 | 0 | N | 0 | 0 | N | 0 | 0 | N | 0 | 0 | N | 0 | 0 |
| 45 | 6/7/98 | N | 0 | 0 | N | 0 | 0 | N | 0 | 0 | N | 0 | 0 | N | 0 | 0 |
| 46 | 13/7/98 | N | 0 | 0 | N | 0 | 0 | N | 0 | 0 | N | 0 | 0 | N | 0 | 0 |
| 47 | 20/7/98 | N | 0 | 0 | N | 0 | 0 | N | 0 | 0 | N | 0 | 0 | N | 0 | 0 |
| 48 | 27/7/98 | N | 0 | 0 | N | 0 | 0 | N | 0 | 0 | N | 0 | 0 | N | 0 | 0 |
| 49 | 3/8/98 | N | 0 | 0 | N | 0 | 0 | N | 0 | 0 | N | 0 | 0 | N | 0 | 0 |
| 50 | 10/8/98 | N | 0 | 0 | N | 0 | 0 | N | 0 | 0 | N | 0 | 0 | N | 0 | 0 |

FIG. 41

| Fms | WeeksDa | a{ 1 | 2 | 3 | b{ 4 | 5 | 6 | c{ 7 | 8 | 9 | d{ 10 | 11 | 12 | e{ 13 | 14 | 15 |
|---|---|---|---|---|---|---|---|---|---|---|---|---|---|---|---|---|
| 1 | 1/9/97 | CC | 0 | 0 | N | 0 | 0 | N | 0 | 0 | N | 0 | 0 | N | 0 | 0 |
| 2 | 8/9/97 | N | 0 | 0 | CC | 0 | 0 | N | 0 | 0 | N | 0 | 0 | N | 0 | 0 |
| 3 | 15/9/97 | N | 0 | 0 | N | 0 | 0 | CC | 0 | 0 | N | 0 | 0 | N | 0 | 0 |
| 4 | 22/9/97 | N | 0 | 0 | N | 0 | 0 | N | 0 | 0 | CM | 0 | 0 | N | 0 | 0 |
| 5 | 29/9/97 | N | 0 | 0 | N | 0 | 0 | N | 0 | 0 | N | 0 | 0 | CM | 0 | 0 |
| 6 | 6/10/97 | N | 0 | 0 | N | 0 | 0 | N | 0 | 0 | N | 0 | 0 | N | 0 | 0 |
| 7 | 13/10/97 | N | 0 | 0 | N | 0 | 0 | N | 0 | 0 | N | 0 | 0 | N | 0 | 0 |
| 8 | 20/10/97 | N | 0 | 0 | N | 0 | 0 | N | 0 | 0 | N | 0 | 0 | N | 0 | 0 |
| 9 | 27/10/97 | N | 0 | 0 | N | 0 | 0 | N | 0 | 0 | N | 0 | 0 | N | 0 | 0 |
| 10 | 3/11/97 | N | 0 | 0 | N | 0 | 0 | N | 0 | 0 | N | 0 | 0 | N | 0 | 0 |
| 11 | 10/11/97 | N | 0 | 0 | N | 0 | 0 | N | 0 | 0 | N | 0 | 0 | N | 0 | 0 |
| 12 | 17/11/97 | N | 0 | 0 | N | 0 | 0 | N | C | 0 | N | 0 | 0 | N | 0 | 0 |
| 13 | 24/11/97 | N | 0 | 0 | N | 0 | 0 | N | 0 | 0 | N | 0 | 0 | N | 0 | 0 |
| 14 | 1/12/97 | N | 0 | 0 | N | 0 | 0 | N | 0 | 0 | N | 0 | 0 | N | 0 | 0 |
| 15 | 8/12/97 | N | 0 | 0 | N | 0 | 0 | N | 0 | 0 | N | 0 | 0 | N | 0 | 0 |
| 16 | 15/12/97 | N | 0 | 0 | N | 0 | 0 | N | 0 | 0 | N | 0 | 0 | N | 0 | 0 |
| 17 | 22/12/97 | N | 0 | 0 | N | 0 | 0 | N | 0 | 0 | N | 0 | 0 | N | 0 | 0 |
| 18 | 29/12/97 | N | 0 | 0 | N | 0 | 0 | N | 0 | 0 | N | 0 | 0 | N | 0 | 0 |
| 19 | 5/1/98 | N | 0 | 0 | N | 0 | 0 | N | 0 | 0 | N | 0 | 0 | N | 0 | 0 |
| 20 | 12/1/98 | N | 0 | 0 | N | 0 | 0 | N | 0 | 0 | N | 0 | 0 | N | 0 | 0 |
| 21 | 19/1/98 | N | 0 | 0 | N | 0 | 0 | N | 0 | 0 | N | 0 | 0 | N | 0 | 0 |
| 22 | 26/1/98 | N | 0 | 0 | N | 0 | 0 | N | 0 | 0 | N | 0 | 0 | N | 0 | 0 |
| 23 | 2/2/98 | N | 0 | 0 | N | 0 | 0 | N | 0 | 0 | N | 0 | 0 | N | 0 | 0 |
| 24 | 9/2/98 | N | 0 | 0 | N | 0 | 0 | N | 0 | 0 | N | 0 | 0 | N | 0 | 0 |
| 25 | 16/2/98 | N | 0 | 0 | N | 0 | 0 | N | 0 | 0 | N | 0 | 0 | N | 0 | 0 |
| 26 | 23/2/98 | N | 0 | 0 | N | 0 | 0 | N | 0 | 0 | N | 0 | 0 | N | 0 | 0 |
| 27 | 2/3/98 | N | 0 | 0 | N | 0 | 0 | N | 0 | 0 | N | 0 | 0 | N | 0 | 0 |
| 28 | 9/3/98 | N | 0 | 0 | N | 0 | 0 | N | 0 | 0 | N | 0 | 0 | N | 0 | 0 |
| 29 | 16/3/98 | N | 0 | 0 | N | 0 | 0 | N | 0 | 0 | N | 0 | 0 | N | 0 | 0 |
| 30 | 23/3/98 | N | 0 | 0 | N | 0 | 0 | N | 0 | 0 | N | 0 | 0 | N | 0 | 0 |
| 31 | 30/3/98 | N | 0 | 0 | N | 0 | 0 | N | 0 | 0 | N | 0 | 0 | N | 0 | 0 |
| 32 | 6/4/98 | N | 0 | 0 | N | 0 | 0 | N | 0 | 0 | N | 0 | 0 | N | 0 | 0 |
| 33 | 13/4/98 | N | 0 | 0 | N | 0 | 0 | N | 0 | 0 | N | 0 | 0 | N | 0 | 0 |
| 34 | 20/4/98 | N | 0 | 0 | N | 0 | 0 | N | 0 | 0 | N | 0 | 0 | N | 0 | 0 |
| 35 | 27/4/98 | N | 0 | 0 | N | 0 | 0 | N | 0 | 0 | N | 0 | 0 | N | 0 | 0 |
| 36 | 4/5/98 | N | 0 | 0 | N | 0 | 0 | N | 0 | 0 | N | 0 | 0 | N | 0 | 0 |
| 37 | 11/5/98 | N | 0 | 0 | N | 0 | 0 | N | 0 | 0 | N | 0 | 0 | N | 0 | 0 |
| 38 | 18/5/98 | N | 0 | 0 | N | 0 | 0 | N | 0 | 0 | N | 0 | 0 | N | 0 | 0 |
| 39 | 25/5/98 | N | 0 | 0 | N | 0 | 0 | N | 0 | 0 | N | 0 | 0 | N | 0 | 0 |
| 40 | 1/6/98 | N | 0 | 0 | N | 0 | 0 | N | 0 | 0 | N | 0 | 0 | N | 0 | 0 |
| 41 | 8/6/98 | N | 0 | 0 | N | 0 | 0 | N | 0 | 0 | N | 0 | 0 | N | 0 | 0 |
| 42 | 15/6/98 | N | 0 | 0 | N | 0 | 0 | N | 0 | 0 | N | 0 | 0 | N | 0 | 0 |
| 43 | 22/6/98 | N | 0 | 0 | N | 0 | 0 | N | 0 | 0 | N | 0 | 0 | N | 0 | 0 |
| 44 | 29/6/98 | N | 0 | 0 | N | 0 | 0 | N | 0 | 0 | N | 0 | 0 | N | 0 | 0 |
| 45 | 6/7/98 | N | 0 | 0 | N | 0 | 0 | N | 0 | 0 | N | 0 | 0 | N | 0 | 0 |
| 46 | 13/7/98 | N | 0 | 0 | N | 0 | 0 | N | 0 | 0 | N | 0 | 0 | N | 0 | 0 |
| 47 | 20/7/98 | N | 0 | 0 | N | 0 | 0 | N | 0 | 0 | N | 0 | 0 | N | 0 | 0 |
| 48 | 27/7/98 | N | 0 | 0 | N | 0 | 0 | N | 0 | 0 | N | 0 | 0 | N | 0 | 0 |
| 49 | 3/8/98 | N | 0 | 0 | N | 0 | 0 | N | 0 | 0 | N | 0 | 0 | N | 0 | 0 |
| 50 | 10/8/98 | N | 0 | 0 | N | 0 | 0 | N | 0 | 0 | N | 0 | 0 | N | 0 | 0 |

FIG. 42

| Fms | WeeksDa | a1 | | | b1 | | | c1 | | | d1 | | | e1 | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| 1 | 1/9/97 | CC | 1 | 0 | N | 0 | 0 | N | 0 | 0 | N | 0 | 0 | N | 0 | 0 |
| 2 | 8/9/97 | FC | 1 | 1 | CC | 0 | 0 | N | 0 | 0 | N | 0 | 0 | N | 0 | 0 |
| 3 | 15/9/97 | FC | 1 | 1 | FC | 2 | 2 | CC | 0 | 0 | N | 0 | 0 | N | 0 | 0 |
| 4 | 22/9/97 | FC | 1 | 1 | FC | 2 | 2 | FC | 3 | 3 | CM | 0 | 0 | N | 0 | 0 |
| 5 | 29/9/97 | FC | 1 | 1 | FC | 2 | 2 | FC | 3 | 3 | FM | 4 | 4 | CM | 0 | 0 |
| 6 | 6/10/97 | FC | 1 | 1 | FC | 2 | 2 | FC | 3 | 3 | FM | 4 | 4 | FM | 5 | 5 |
| 7 | 13/10/97 | FC | 1 | 1 | FC | 2 | 2 | FC | 3 | 3 | FM | 4 | 4 | FM | 5 | 5 |
| 8 | 20/10/97 | FC | 1 | 1 | FC | 2 | 2 | FC | 3 | 3 | FM | 4 | 4 | FM | 5 | 5 |
| 9 | 27/10/97 | FC | 1 | 1 | FC | 2 | 2 | FC | 3 | 3 | FM | 4 | 4 | FM | 5 | 5 |
| 10 | 3/11/97 | FC | 1 | 1 | FC | 2 | 2 | FC | 3 | 3 | FM | 4 | 4 | FM | 5 | 5 |
| 11 | 10/11/97 | FC | 1 | 1 | FC | 2 | 2 | FC | 3 | 3 | FM | 4 | 4 | FM | 5 | 5 |
| 12 | 17/11/97 | FC | 1 | 1 | FC | 2 | 2 | FC | 3 | 3 | FM | 4 | 4 | FM | 5 | 5 |
| 13 | 24/11/97 | FC | 1 | 1 | FC | 2 | 2 | FC | 3 | 3 | FM | 4 | 4 | FM | 5 | 5 |
| 14 | 1/12/97 | FC | 1 | 1 | FC | 2 | 2 | FC | 3 | 3 | FM | 4 | 4 | FM | 5 | 5 |
| 15 | 8/12/97 | FC | 1 | 1 | FC | 2 | 2 | FC | 3 | 3 | FM | 4 | 4 | FM | 5 | 5 |
| 16 | 15/12/97 | FC | 1 | 1 | FC | 2 | 2 | FC | 3 | 3 | FM | 4 | 4 | FM | 5 | 5 |
| 17 | 22/12/97 | FC | 1 | 1 | FC | 2 | 2 | FC | 3 | 3 | FM | 4 | 4 | FM | 5 | 5 |
| 18 | 29/12/97 | FC | 1 | 1 | FC | 2 | 2 | FC | 3 | 3 | FM | 4 | 4 | FM | 5 | 5 |
| 19 | 5/1/98 | FC | 1 | 1 | FC | 2 | 2 | FC | 3 | 3 | FM | 4 | 4 | FM | 5 | 5 |
| 20 | 12/1/98 | FC | 1 | 1 | FC | 2 | 2 | FC | 3 | 3 | FM | 4 | 4 | FM | 5 | 5 |
| 21 | 19/1/98 | FC | 1 | 1 | FC | 2 | 2 | FC | 3 | 3 | FM | 4 | 4 | FM | 5 | 5 |
| 22 | 26/1/98 | FC | 1 | 1 | FC | 2 | 2 | FC | 3 | 3 | FM | 4 | 4 | FM | 5 | 5 |
| 23 | 2/2/98 | FC | 1 | 1 | FC | 2 | 2 | FC | 3 | 3 | FM | 4 | 4 | FM | 5 | 5 |
| 24 | 9/2/98 | FC | 1 | 1 | FC | 2 | 2 | FC | 3 | 3 | FM | 4 | 4 | FM | 5 | 5 |
| 25 | 16/2/98 | FC | 1 | 1 | FC | 2 | 2 | FC | 3 | 3 | FM | 4 | 4 | FM | 5 | 5 |
| 26 | 23/2/98 | FC | 1 | 1 | FC | 2 | 2 | FC | 3 | 3 | FM | 4 | 4 | FM | 5 | 5 |
| 27 | 2/3/98 | FC | 1 | 1 | FC | 2 | 2 | FC | 3 | 3 | FM | 4 | 4 | FM | 5 | 5 |
| 28 | 9/3/98 | FC | 1 | 1 | FC | 2 | 2 | FC | 3 | 3 | FM | 4 | 4 | FM | 5 | 5 |
| 29 | 16/3/98 | CC | 0 | 0 | EC | 2 | 1 | FC | 3 | 3 | FM | 4 | 4 | FM | 5 | 5 |
| 30 | 23/3/98 | CC | 0 | 0 | EC | 2 | 1 | FC | 3 | 3 | FM | 4 | 4 | FM | 5 | 5 |
| 31 | 30/3/98 | CC | 0 | 0 | EC | 2 | 1 | FC | 3 | 3 | FM | 4 | 4 | FM | 5 | 5 |
| 32 | 6/4/98 | FC | 6 | 6 | EC | 2 | 1 | FC | 3 | 3 | FM | 4 | 4 | FM | 5 | 5 |
| 33 | 13/4/98 | FC | 6 | 6 | EC | 2 | 1 | FC | 3 | 3 | FM | 4 | 4 | FM | 5 | 5 |
| 34 | 20/4/98 | FC | 6 | 6 | EC | 2 | 1 | CC | 0 | 0 | FM | 4 | 4 | FM | 5 | 5 |
| 35 | 27/4/98 | FC | 6 | 6 | EC | 2 | 1 | CC | 0 | 0 | FM | 4 | 4 | FM | 5 | 5 |
| 36 | 4/5/98 | FC | 6 | 6 | EC | 2 | 1 | CC | 0 | 0 | FM | 4 | 4 | FM | 5 | 5 |
| 37 | 11/5/98 | FC | 6 | 6 | EC | 2 | 1 | CC | 0 | 0 | FM | 4 | 4 | FM | 5 | 5 |
| 38 | 18/5/98 | FC | 6 | 6 | EC | 2 | 1 | FC | 7 | 7 | FM | 4 | 4 | FM | 5 | 5 |
| 39 | 25/5/98 | FC | 6 | 6 | EC | 2 | 1 | FC | 7 | 7 | FM | 4 | 4 | FM | 5 | 5 |
| 40 | 1/6/98 | FC | 6 | 6 | CC | 2 | 0 | FC | 7 | 7 | FM | 4 | 4 | FM | 5 | 5 |
| 41 | 8/6/98 | FC | 6 | 6 | CC | 0 | 0 | FC | 7 | 7 | FM | 4 | 4 | FM | 5 | 5 |
| 42 | 15/6/98 | FC | 6 | 6 | CC | 0 | 0 | FC | 7 | 7 | CM | 0 | 0 | FM | 5 | 5 |
| 43 | 22/6/98 | FC | 6 | 6 | FC | 0 | 8 | FC | 7 | 7 | CM | 0 | 0 | CM | 0 | 0 |
| 44 | 29/6/98 | FC | 6 | 6 | FC | 8 | 8 | FC | 7 | 7 | CM | 0 | 0 | CM | 0 | 0 |
| 45 | 6/7/98 | FC | 6 | 6 | FC | 8 | 8 | FC | 7 | 7 | FM | 9 | 9 | CM | 0 | 0 |
| 46 | 13/7/98 | FC | 6 | 6 | FC | 8 | 8 | FC | 7 | 7 | FM | 9 | 9 | FM | 10 | 10 |
| 47 | 20/7/98 | FC | 6 | 6 | FC | 8 | 8 | FC | 7 | 7 | FM | 9 | 9 | FM | 10 | 10 |
| 48 | 27/7/98 | FC | 6 | 6 | FC | 8 | 8 | FC | 7 | 7 | FM | 9 | 9 | FM | 10 | 10 |
| 49 | 3/8/98 | FC | 6 | 6 | FC | 8 | 8 | FC | 7 | 7 | FM | 9 | 9 | FM | 10 | 10 |
| 50 | 10/8/98 | FC | 6 | 6 | FC | 8 | 8 | FC | 7 | 7 | FM | 9 | 9 | FM | 10 | 10 |

FIG. 43

| Field NAME | | Field NAME |
|---|---|---|
| Fmsid | | AutoNumber |
| Weeksdate | | Date/Time |
| | 1 | Text |
| | 2 | Number |
| | 3 | Number |
| | 4 | Text |
| | 5 | Number |
| | 6 | Number |
| | 7 | Text |
| | 8 | Number |
| | 9 | Number |
| | 10 | Text |
| | 11 | Number |
| | 12 | Number |
| | 13 | Text |
| | 14 | Number |
| | 15 | Number |

000000000000000
APPARATUS AND METHODS FOR MANAGEMENT OF FLOCKS OF LAYER FOWL

FIELD OF THE INVENTION

Appendices described below are on five microfiche having 436 frames.

The present invention relates to apparatus and methods for breeding layer fowl such as turkeys.

BACKGROUND OF THE INVENTION

Layer fowl such as turkeys differ in their laying performance. Some turkeys are "broody", i.e. they exhibit a desire to sit on their eggs (brood) and, if not treated, generally stop laying eggs altogether. Some turkeys lay more eggs than others. Some turkeys tend to lay their eggs outside of the laying pens.

Bird or fowl transponder equipment devices are known. One conventional device has a slim, rod-shaped transponder mounted on an arm of electrically non-conducting material, in the form of U, V, or Z wing shape, with limbs connected by a joint and with a locking device. Another conventional transponder equipment device has a wing section for fitting to the fowl. This device mounts a rod-shaped, slim transponder along the arm of a U-shaped two-armed marker for clasping round the bone of the fowl, closed at the free ends of arms by a hooked point engaging in a socket hole. Also known is a time recording device designed for pigeon racing has a transponder fitted to a leg that contains secured data and entered data for exchange over a magnetic field link to a central station.

Also known is registering apparatus for tamper-proof detection of real-time sporting information, particularly for carrier pigeon racing. This apparatus includes a detection device, a reader combining detected data with expansion and security data, a portable operating device with data memory and a central evaluation unit.

A joint brochure by Jansen Automatic Nests, Diehl Ident GmbH and Hotraco bv describes a computerized automated trap-nest including a bird expel system, an individual bird identification unit and individual egg identification. The system includes an RF/ID identification system for poultry breeding stock which is operative to provide automatic performance control and data allocation such as egg to hen. An electronic wing band is attached to the bird. The system allows nesting behavior to be automatically recorded. To do this, the nesting time of the individual hens is recorded by means of antennas. An egg collection belt keeps the eggs from each nest separate. Each bird and each nesthole is fitted with a transponder which allows individual identification of each bird and each egg laid.

U.S. Pat. No. 4,188,911 to Rafaely describes an enclosure device for encouraging the laying of eggs by domestic fowls particularly turkeys.

U.S. Pat. No. 4,889,076 to Cohen describes a nest trap for laying hens, particularly turkeys.

Published PCT Application PCT US96/06441 (WO 96/35327) describes hen nesting apparatus and a brood control method. The hens carry transponders which may be interrogated by a reader movable along the line of cages to identify the hens and to keep track of their activities.

MGH Automated Nesting System is a nesting system particularly suited for turkeys which is commercially available from M.G.H. Agricultural Cooperative Society Ltd., Kibbutz Givat Haim Ichud, Israel 38935.

The disclosures of all publications mentioned in the specification and of the publications cited therein are hereby incorporated by reference.

SUMMARY OF THE INVENTION

The present invention seeks to provide a computerized system for managing a flock of layer fowl such as turkeys each of which preferably wears a tag holder containing a personal, typically RF-based, identification tag.

When the specification or drawings refer to "turkeys" it is understood that the invention is not intended to be limited to turkeys and in fact is suitable for layer fowl of all kinds including, for example, chickens.

Preferably, the system senses the entrance of a hen into a nest or cage and records it entrance. After a specified period of time the system ejects the hen from the nest e.g. by engaging the nest door.

If an egg has been laid it is swept out of the nest, e.g. by backward motion of the door that is installed with a one-way flap, such that the egg rolls out of the nest until it reaches an egg collection barrier.

Preferably, hen presence sensing and egg sensing is sensed by a trolley, e.g. the trolley shown in FIGS. 4–5 of the above-referenced copending PCT Application, which travels along a row of nests rather than providing a hen presence sensor and egg sensor for each nest. The trolley's hen presence sensor preferably senses hen presence as above, as it travels along the row of nests. On the following pass of the trolley, the system senses whether an egg is present at the barrier of the specific nest. If so, the system records its presence and matches it with the hen that was last identified as being in that nest. The eggs, after being identified, are typically swept onto a conveyor belt which brings them to a central egg collection area.

The trolley is preferably fitted with air nozzles which clean the egg barriers and electrical channels.

In case of system malfunction, the system preferably switches into semi-automatic mode in which all of the nest are engaged continuously and all hens are pushed out simultaneously, e.g. once an hour.

Typically, a farm includes 1–10 barns (houses). Each farm houses a flock which is typically composed of between 10,000 to 40,000 same-age birds. Each house includes 2–4 rows of nests. Typically, each row of nests is approximately 100 meters long and includes 200–300 nests.

There is thus provided, in accordance with a preferred embodiment of the present invention, a layer flock management system including a layer information accumulator operative to accumulate information regarding each of a multiplicity of layers in a flock, and a floor layer identifier operative to identify floor layers from among the multiplicity of layers.

Also provided, in accordance with another preferred embodiment of the present invention, is a layer flock management system including a layer information accumulator operative to accumulate information regarding each of a multiplicity of layers in a flock, and a broody hen identifier operative to identify broody hens from among the multiplicity of layers.

Also provided, in accordance with another preferred embodiment of the present invention, is a method for layer flock management including accumulating information regarding each of a multiplicity of layers in a flock, recognizing a layer, upon presentation of the layer, and presenting the information regarding that layer to a farmer handling the layer.

Further in accordance with a preferred embodiment of the present invention, the method also includes discarding some of the multiplicity of layers from the flock, based on the information.

Still further in accordance with a preferred embodiment of the present invention, the information includes a layer quality score.

Also provided, in accordance with another preferred embodiment of the present invention, is a method for layer flock management so as to enhance egg production in a given facility, the method including automatically monitoring laying performance of each layer in a plurality of flocks, each flock including a multiplicity of layers, based on a result of the monitoring, selecting best layers in each flock, and combining the best layers into new flocks, removing all layers except the best layers and filling the facility by introducing new layers.

Further in accordance with a preferred embodiment of the present invention, the combining step includes automatically generating a combination schedule for combining the best layers into new flocks.

Also provided, in accordance with another preferred embodiment of the present invention, is a layer flock management method including accumulating information regarding each of a multiplicity of layers in a flock, and identifying floor layers from among the multiplicity of layers.

Also provided, in accordance with another preferred embodiment of the present invention, is a layer flock management method including accumulating information regarding each of a multiplicity of layers in a flock, and identifying broody hens from among the multiplicity of layers.

Also provided, in accordance with another preferred embodiment of the present invention, is a system for layer flock management including a layer information accumulator operative to accumulate information regarding each of a multiplicity of layers in a flock, a layer information presenter operative, upon presentation of a layer, to recognize the layer and to present the information regarding that layer to a farmer handling the layer.

Additionally in accordance with a preferred embodiment of the present invention, the information includes a layer quality score.

A system for layer flock management so as to enhance egg production in a given facility, the system including a layer performance monitor operative to automatically monitor laying performance of each layer in a plurality of flocks, each flock including a multiplicity of layers, a best layer selector operative, based on a result of the monitoring, to select best layers in each flock, and a flock planner operative to combine the best layers into new flocks, removing all layers except the best layers and filling the facility by introducing new layers.

Further in accordance with a preferred embodiment of the present invention, the flock planner is operative to automatically generate a combination schedule for combining the best layers into new flocks.

Also provided, in accordance with another preferred embodiment of the present invention, is a breeding method including breeding a final product generation from a parent stock generation, each generation including males and females, and selecting a subset of final product females which are both heavy and good layers, and breeding the subset of final product females with parent stock males.

Also provided, in accordance with another preferred embodiment of the present invention, is a method for breeding layers for use in a plurality of locations, the method including breeding a population of layers, monitoring a plurality of samples of the population of layers in a corresponding plurality of laying locations, respectively, at which layers are to be kept, and based on output from the monitoring step, breeding a plurality of subpopulations which are successful layers in the corresponding plurality of locations, respectively.

Preferably, the plurality of laying locations are located in different climates.

BRIEF DESCRIPTION OF THE DRAWINGS

The present invention will be understood and appreciated from the following detailed description, taken in conjunction with the d wings in which:

FIG. 7A is a pictorial illustration of a graph, depicting clutch length and elapsed time between eggs, which may be generated by the central management computer of FIG. 1;

FIG. 7B is a pictorial illustration of a graph, depicting egg production distribution for a flock, which may be generated by the central management computer of FIG. 1 and including information regarding hens visiting nests and (shaded) hens which are floor layers;

FIGS. 8–23, taken together, form a detailed electronic diagram of a preferred embodiment of the in-barn control unit of FIG. 1;

FIGS. 27–29 are pictorial illustrations of screen displays generated by a preferred embodiment of the flock planner of FIG. 1;

FIGS. 30 and 31 are growth and feed efficiency tables for toms and hens for various different turkey genotypes;

FIG. 32 is a table which estimates the impact of increasing egg production in the dam of the super commercial turkey;

FIG. 33 is a pictorial illustration of a turkey production pyramid showing generations of fowl;

FIG. 34 is a heritability diagram showing that heritability in turkeys is largely additive;

FIG. 38 is an example of a screen display which may be generated by the flock planner showing input of flock cycles with tolerances, (1st cycle, extension, dark house, clean-out, and recycle), the maximum number of weeks allowable for 1st cycle plus extension, and number of weeks planned;

FIGS. 39A–39B, taken together, form an example of a screen display which may be generated by the flock planner of FIG. 1, showing input of farm details; and FIGS. 40–43 are pictorial illustrations of tables which may be generated by the flock planner.

Figure 1:
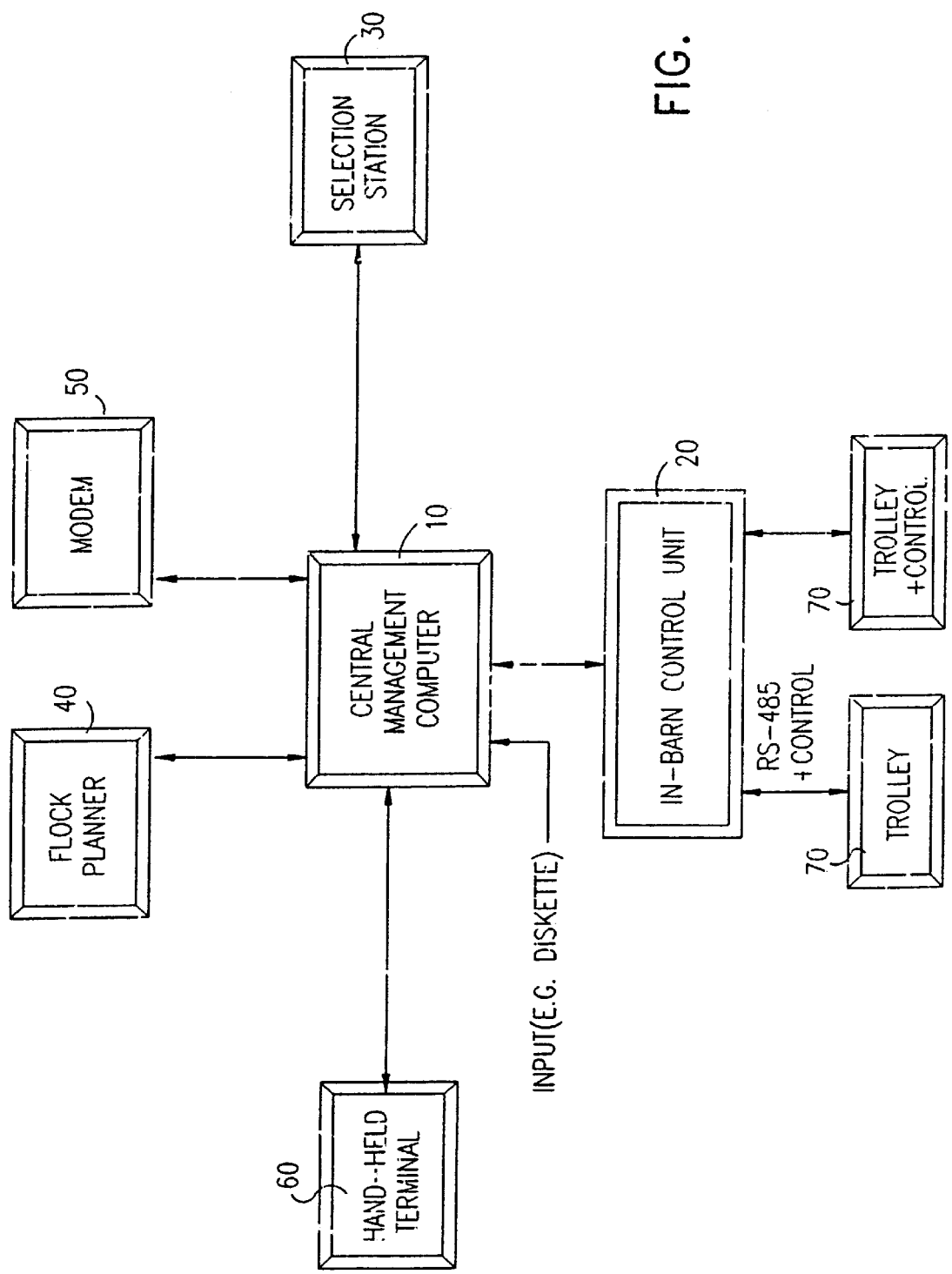
FIG. 1 is a simplified block diagram illustration of a turkey layer management system constructed and operative in accordance with a preferred embodiment of the present invention.

Attached herewith are the following appendices which aid in the understanding and appreciation of one preferred embodiment of the invention shown and described herein:

Appendix A is a hexadecimal computer listing of a computer program implementing a preferred method of operation for the central management computer of FIG. 1;

Appendix B is a hexadecimal computer listing of a computer program implementing a preferred method of operation for the in-barn control unit of FIG. 1;

Appendix C is a hexadecimal computer listing of a computer program implementing a preferred method of operation for the selection station of FIG. 1;

Appendix D is a computer listing of a computer program which may reside in the central management computer of FIG. 1 and which calls the programs of Appendices A–C.

Appendix E is a hexadecimal computer listing of a computer program implementing a preferred method of operation for the flock planner of FIG. 1;

Appendix F is a description of a preferred data structure for the central management computer of FIG. 1.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

As described above, Published PCT Application PCT US96/06441 (WO 96/35327) describes hen nesting apparatus and a brood control method. The hens carry transponders which may be interrogated by a reader (trolley) movable along the row of cages to identify the hens and to keep track of their activities.

FIG. 1 illustrates a preferred embodiment of a hen management system which preferably processes each cage individually and which is useful in conjunction with a nesting system.

As shown, the system of FIG. 1 includes a central management computer 10, a plurality of in-barn control units 20 each associated with a plurality of trolleys 70 (e.g. unit 18 of FIG. 4 of the above-referenced copending PCT application) and with computer 10, e.g. via an RS-485 connection, a selection station 30, a flock planner 40, a modem 50 and a hand-held terminal 60. For simplicity, only one in-barn control unit 20 is shown however any suitable number of in-barn control units 20, such as 1–20 in-barn control units, may be associated with each computer 10. For example, 4 in-barn control units may be associated with each computer 10, each unit 20 being associated with 2 trolleys 70 each monitoring a row of cages or nests (not shown).

Preferably, all aspects of hen activity are gathered by the trolley with the possible exception of a small number of hand-recorded events such as deaths and removal from flock which are recorded using the hand-held terminal 60.

Figure 6:
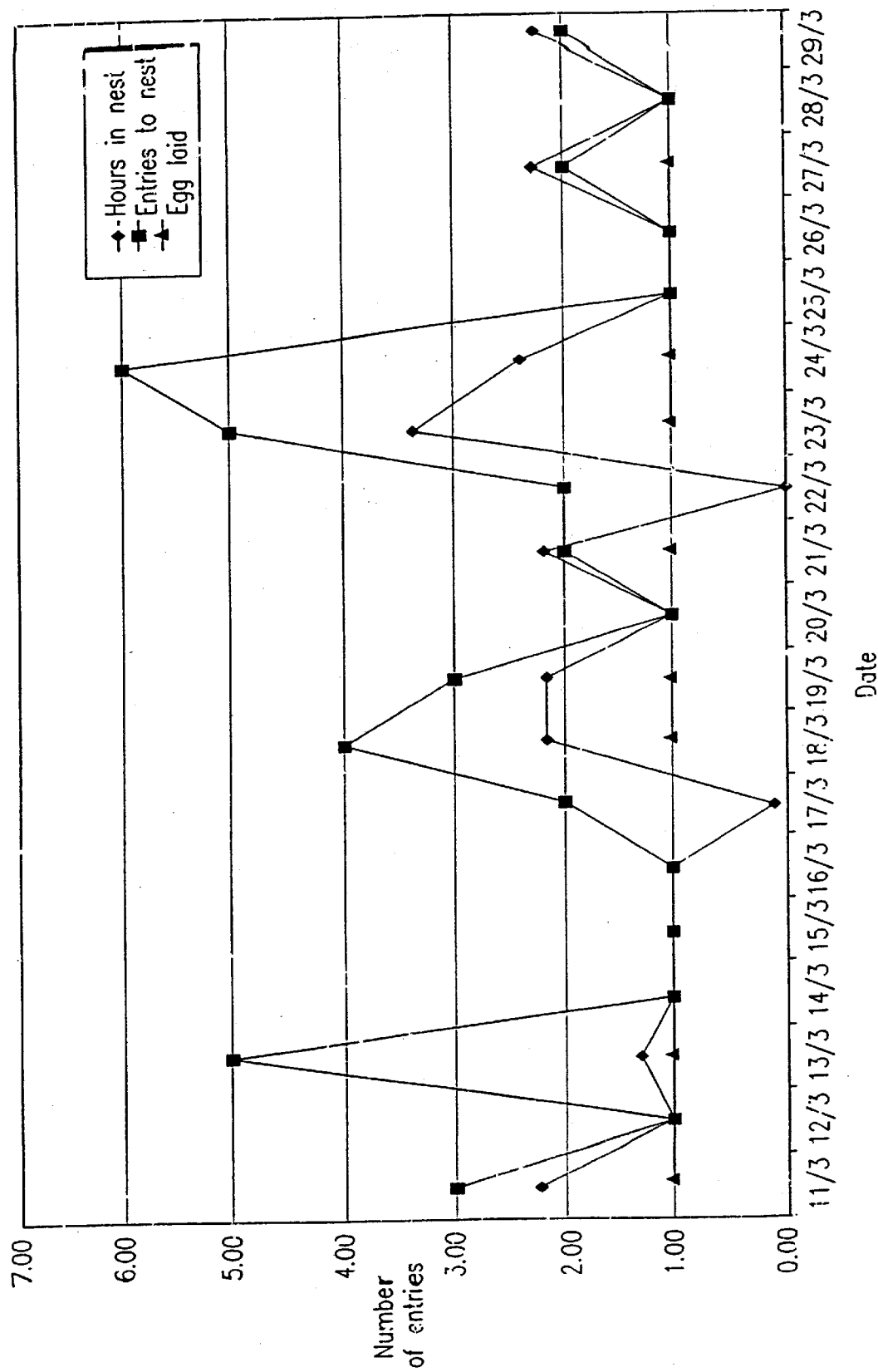
FIG. 6 is a pictorial illustration of a graph, depicting nesting behavior, generated by the central management computer of FIG. 1.
Figure 36:
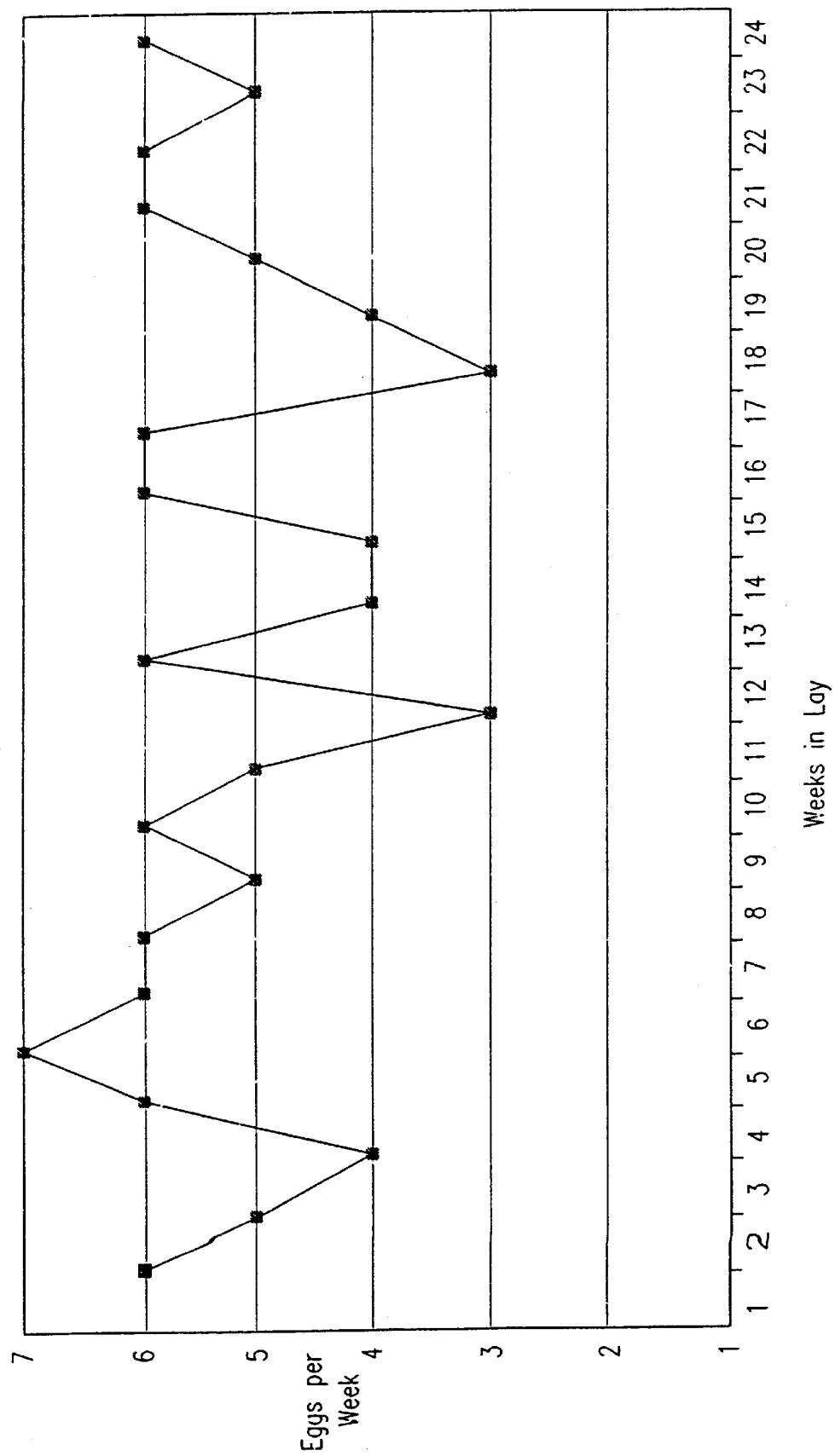
FIG. 36 is a pictorial illustration of a graph, depicting week egg production, which may be generated by the central management computer of FIG. 1.

The central management computer 10 receives data characterizing use of the cages by the hens, from control units 20 located at each of a plurality of barns. The computer 10 processes this data and generates, (periodically or upon request) information pertaining to flock performance and behavior. This information typically includes but is not limited to information regarding nesting behavior, e.g. as shown in FIG. 6, and/or information pertaining to clutch length and elapsed time between eggs, e.g. as shown in FIG. 7A and/or information pertaining to egg production distribution, e.g. as shown in FIG. 7B, and/or information pertaining to the number of entries into cages and/or information pertaining to the number of times each hen exhibited broody behavior and/or floor-laying behavior. Another suitable example of a graph is illustrated in FIG. 36. It is appreciated that an enormous variety of graphed information may be generated of which the graphs shown herein are merely examples.

The central management computer 10 is also operative to store information regarding layers and to identify good layers.

The central management computer can changes parameters and send these changes directly to the barn control units. The central computer may be connected to other units by any suitable means such as on-line, by cable or by diskette. Preferably, the central computer receives on-line notification of technical failures in any of the barns, and generates an alert for a human farm manager.

The in-barn control unit 20 receives data on-line from the trolley 70 inter alia. The unit 20 performs data analysis which is sent periodically to the central computer 10. The selection station 30 is typically located at the insemination site and includes hen identification antennae. Once a hen being inseminated is identified by the antennae, the central management computer 10 preferably accesses information regarding the hen and categorizes the hen into one of a few categories, such as two categories (floor-layer and non floor-layer). Categorization of a given hen is displayed to the operator by any suitable method. For example, a plurality of lights may be provided corresponding to the plurality of categories being employed. As a hen is taken up, one of the lights goes on indicating the category to which the hen belongs. The human operator handling the hen may then place the hen into the appropriate location from among a plurality of locations corresponding to the categories respectively.

Figure 3:
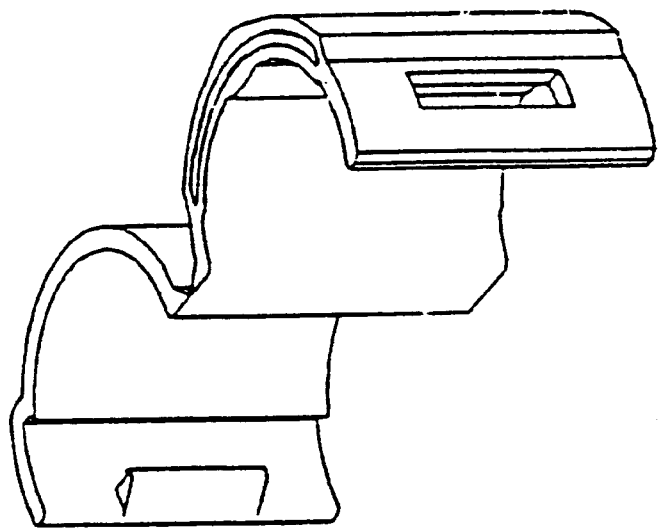
FIGS. 2 and 3 are two simplified isometric views of an RF tag holder suitable for attachment to the leg of a fowl such as a turkey.
Figure 2:
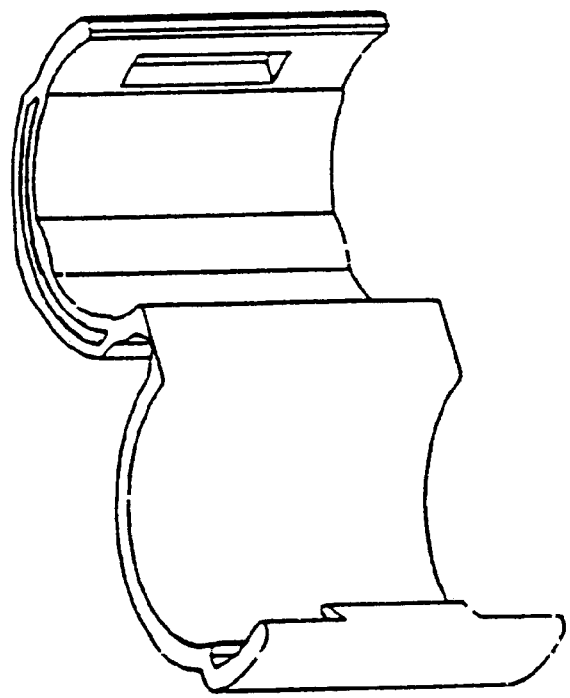

FIGS. 2 and 3 are two simplified isometric views of an RF tag holder suitable for attachment to the leg of a fowl such as a turkey.

The RF tag may comprise any suitable RF tag such as tag #1911233 produced by Sokymat, Zone Industrielle, Granges CH-1614, Switzerland.

Figure 25:
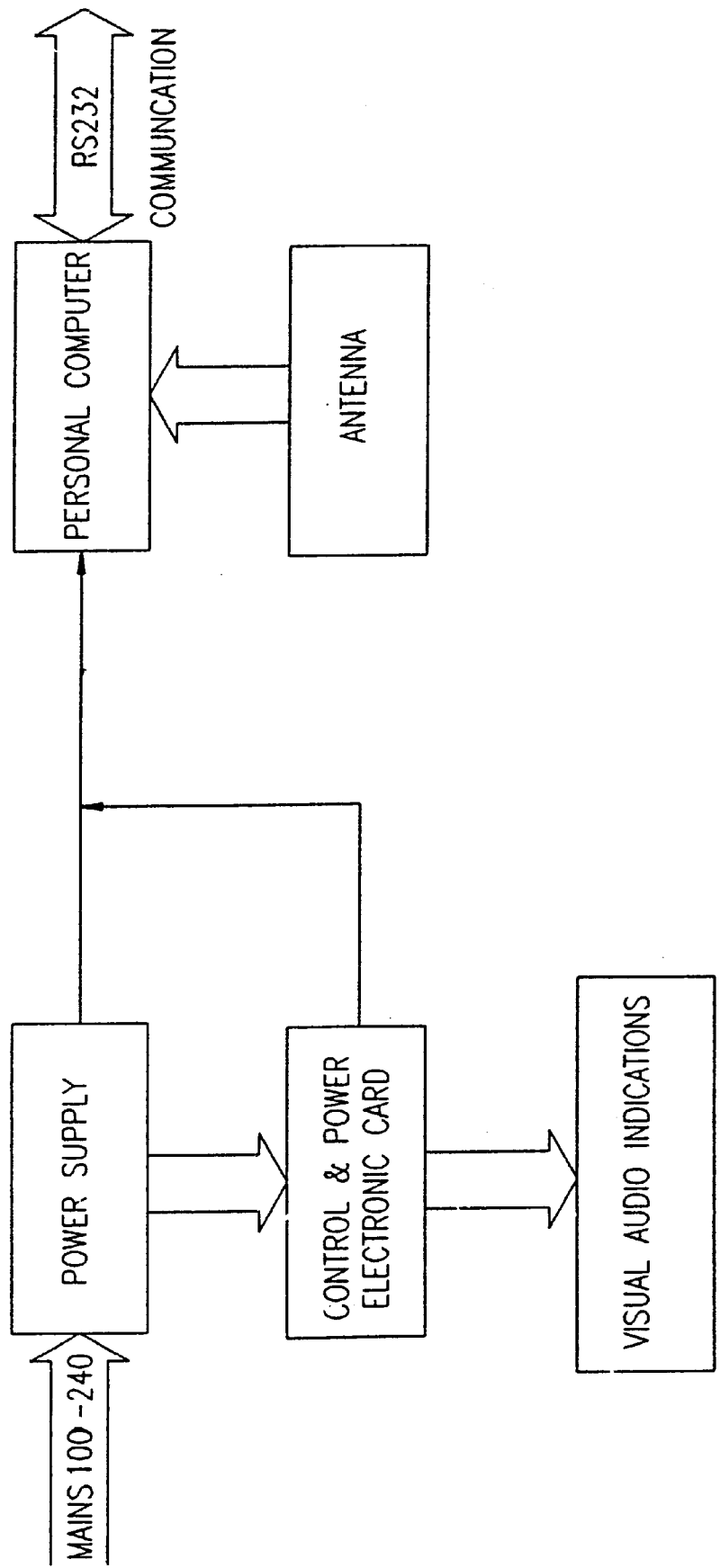
FIG. 25 is a simplified block diagram illustration of a preferred embodiment of the selection station of FIG. 1.

FIG. 25 is a simplified block diagram illustration of a preferred embodiment of selection station 30.

A particular advantage of the central management computer 10 is that it is useful in breeding layers which are particularly suited to laying under particular conditions (i.e. climate, housing, nutrition, etc.). Until the development of the system of FIG. 1, primary breeding could only be carried out in a central location under a single set of standard conditions. The central management computer can be employed to monitor individual layers which are part of a commercial breeding population, thereby to generate information regarding the performance of these layers in the particular field conditions in which the central management computer is situated. This information can then be used to breed a subpopulation which is particularly suited to laying in the conditions in question. Other subpopulations can similarly be developed which are particularly suited to laying under other various field conditions, by monitoring layers from the same initial breeding population, under these other particular field conditions, using systems such as the system of FIG. 1, situated in each of the other field conditions.

Appendix F is a description of a preferred data structure for the central management computer of FIG. 1. The Birds table stores information regarding each layer in the flock. Queries regarding individual birds typically access this table.

The Dataimport table interfaces between external devices, the hand-held terminal 60 of FIG. 1, the selection station 30 of FIG. 1, the farm and the database. The table is a temporary table or buffer which is filled each time data is transferred from the in-barn control unit 20, terminal 60, or selection station 30 into the central management computer 10. Typically, coherence checks and/or validation operations are performed on the data in the dataimport table before data is transferred out to other tables.

The Event_codes table stores the codes sent in by terminal or external units which feed data into the central computer (typically units 20, 30 and 60 of FIG. 1). For example, code value 21 may correspond to death of a fowl.

The Events table, which is a history table, stores each event which occurs in the flock or flocks being monitored. These events are typically input by units 20, 30 or 60. Typically, each bird is involved in at least 2–3 events daily and therefore the table increases in size very quickly. Events include, for example: Entrance to nest, exit from nest, laying of egg, broody episode, death, and removal from flock.

An example of a suitable coding scheme for events is the following:
1 Egg laid—pushed by system
2 Bird died
3 Identified as closed
4 Identified as broody
5 Void entry—pushed by system
6 Removed from flock
7 Broody but not treated
9 Transferred
11 Invalid egg
14 Computer broody ID 1 day
21 Egg laid—self exit
24 Computer broody ID 2 days
25 Void entry—self exit
26 Short void entry—pushed
30 Dummy code
31 Egg laid—time unknown
35 Void entry—already laid
91 ALL egg types (1 or 21 or 31 or 11)
95 ALL void entries (5 or 25 or 26 or 35)

The Flock table stores information regarding an entire flock so as to allow different flocks to be compared.

The Groups table is a query table which stores queries. A "group" is defined virtually and groups of birds typically are not physically adjacent to one another. For example, a "group" may be defined which consists of all birds which underwent at least 3 episodes of broodiness. The table typically stores the definition of the group rather than an identification of each bird belonging to the group. When it is desired to process a particular group, the birds belonging to the group may be accessed by using the queries in the Groups table and processing the data in the Birds table.

The Weeklist table indicates whether or not a report has been issued for a particular barn in a particular week.

The Weekly table stores information regarding the behavior and performance of each individual hen over an individual week, including entrances to and exits from cages, amount of time spent in cage, daily egg-laying, broodiness, treated broodiness, and accumulated eggs per week.

Variable definitions for Appendix F are as follows:

TABLE

| Birds | |
|---|---|
| Id | Tag number |
| Start date | Date tag placed on hen |
| Flock | Name of flock |
| House | Name of barn |
| Closed | Hen physically unable to lay |
| Broody | Broody |
| Rejected date | Date removed from flock |
| Rejected | Reason removed from flock |
| Group | Which group placed (broody, high layers, poor layer, floor layer, etc) |

TABLE

| DataImport | |
|---|---|
| Desc | Description |
| Row | Row number in barn |
| Event | What event took place (broody, mortality, broody treatment, egg laid etc.) |
| Id | Tag number |
| Entry time | Time entered nest |
| Laying time | Time egg laid |
| Exit time | Time left nest |
| Cell number | Entered which nest |
| Date | Date of event |

TABLE

| event codes | |
|---|---|
| Code | Code number of event |
| Event description | Description of event |
| Flock | |
| Name | Name of flock |
| Hen type | First cycle, extended, or recycled |
| Start | Date flock began |
| Hen housed | Number of hens placed in barn at beginning of flock |
| Hen source | Where the hen came from |
| Live hen | Hens alive at the time |
| Eggs total | Accumulated number of eggs laid |
| Eggs per housed | Number of eggs per hen originally placed in the barn |
| Mortality | Number of hens died |

TABLE

| WeekList | |
|---|---|
| Week id | First day of week in question |
| Day input | Data for day |

TABLE-continued

Weekly

| | |
|---|---|
| Id | Tag number |
| Week id | First day of week in question |
| Entree | Entrees to nest |
| Cell time | Time spent in nests |
| Laying | Daily laying status (if laid or not) |
| Broody | |
| Broody treatment | Which broody treatment received |
| Egg | Number of eggs laid in week in question |

The flock planner 40 typically is operative to schedule occupation of facilities by flocks including recycling portions of flocks and combining these portions to form a complete flock. This allows the information identifying the good layers to be utilized by extending the laying period of good layers, thereby maximizing egg output for given facilities over a given time period. The flock planner takes into account parameters such as length of cleaning period, length of stay in darkrooms before recycling, initial age of layers, etc. A particular advantage of the flock planner is that use of facilities is planned such that, for example, a darkroom is available when needed. According to one preferred embodiment of the present invention, the top 50% of layers of two flocks may be combined into a single flock.

It is appreciated that optionally, the functionalities of the in-barn control unit may be assigned to the trolley by adding a suitable processor to the trolley and eliminating the in-barn control unit 20.

A preferred embodiment of the flock planner is now described.

Figure 24:
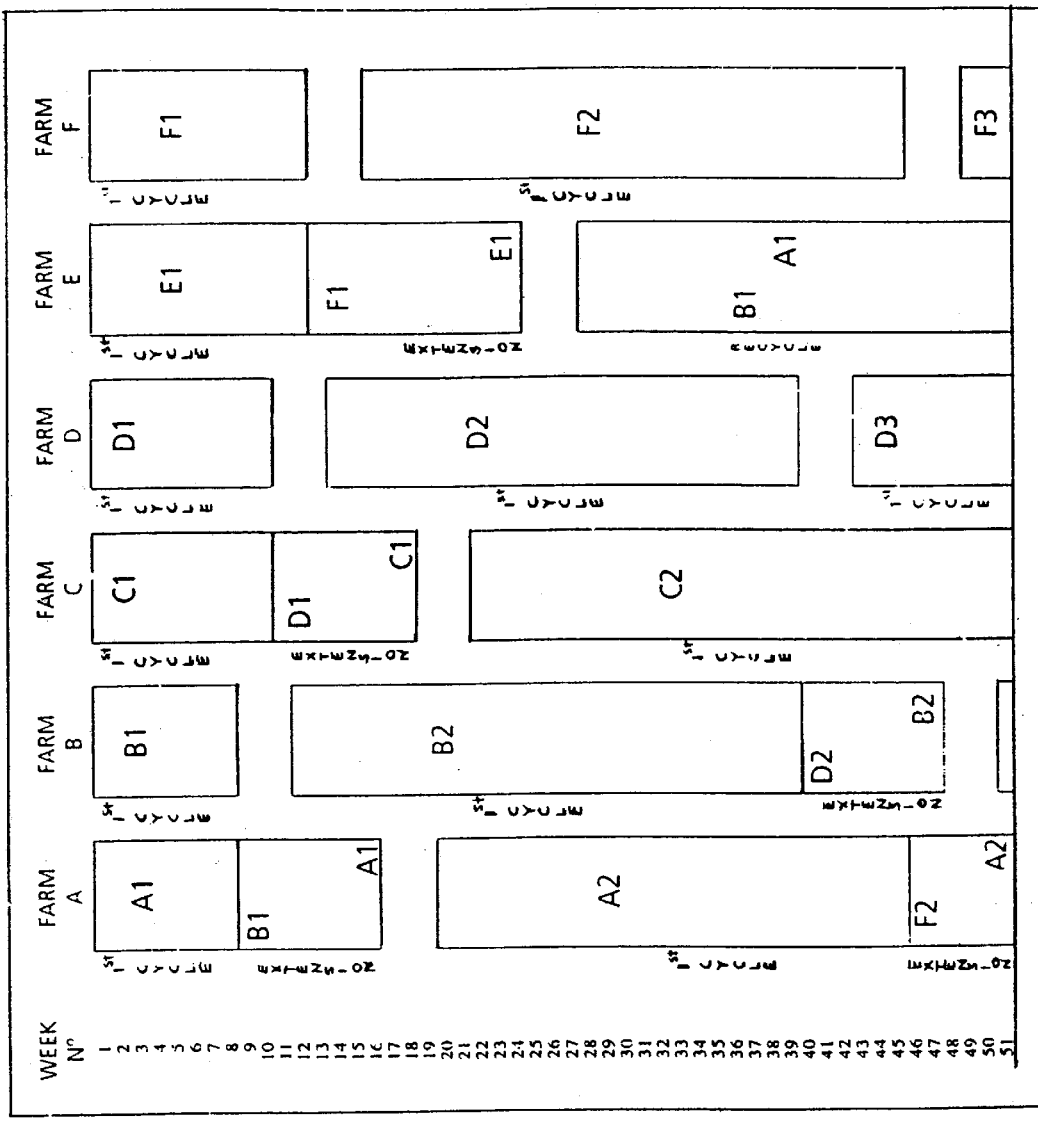
FIG. 24 is a pictorial illustration of a screen display of a combination schedule for combining the best layers into new flocks, preferably generated by the flock planner.

FIGS. 27–29 are pictorial illustrations of screen displays generated by a preferred embodiment of the flock planner 40. The information displayed in FIGS. 27–29 is useful in planning flock combinations and allows first-cycle top layers from various farms to be combined into extended and recycled flocks. FIG. 24 is a pictorial illustration of a screen display of a combination schedule for combining the best layers into new flocks, also preferably generated by the flock planner 40.

A particular feature of a preferred embodiment of the present invention is that costs are preferably reduced by identifying top layers for extended lay and force molt, thereby increasing egg production.

FIG. 38 is an example of a screen display which may be generated by the flock planner (also termed here "screen 1") showing input of flock cycles with tolerances, (1st cycle, extension, dark house, clean-out, and recycle), the maximum number of weeks allowable for 1st cycle plus extension, and number of weeks planned.

FIGS. 39A–39B, taken together, form an example of a screen display which may be generated by the flock planner (also termed here "screen 2") showing input of farm details including name, quantity of hens, entry day of following flock, and if the farm is fitted with a Flock Management System such as that shown and described herein.

The flock planner preferably creates a basis for a suitable table which may include fields (week number, week date, and 3 columns for each farm). In the illustrated table (FIG. 40), for example, the first column is for type of cycle and if it is FMS or not, the second column is for identity of flock #1 and the third column is for identity of flock #2.

Based on data received in screens 1 and 2 (FIGS. 38 and 39A–B) the flock planner may, as shown in FIG. 41, fill in the columns as follows: Column 1 week number, Column 2 list of dates beginning with earliest recorded in screen 2 and continuing at weekly intervals for as many weeks as flocks planned. For each farm, Column 1 is "N", column 2 "0", column 3 "0".

From screen 2 (FIGS. 39A–B), the flock planner may take the entry date of next flock and if it is FMS or not, and finds that date in the table and marks "CC" (FMS), or "CM" (not FMS), and does the same for every farm, as shown in FIG. 42.

The flock planner may then scan every two weeks and look for the following possibilities:

| | | | | | | | | |
|---|---|---|---|---|---|---|---|---|
| Week 1 | CC | CM | FC | FM | EC | EM | RC | RM |
| Week 2 | N | N | N | N | N | N | N | N |

As shown in FIG. 43, the flock planner may then analyze the data to choose the proper cycle for each farm for that date, and may enter the minimum number of weeks required. If no possibility is found, it may look for the following possibilities:

| | | | | | | | | |
|---|---|---|---|---|---|---|---|---|
| Week 1 | CC | CM | FC | FM | EC | EM | RC | RM |
| Week 2 | CC | CM | FC | FM | EC | EM | RC | RM |
| Week 3 | N | N | N | N | N | N | N | N |

The key to the letters is:

| First letter | Second letter |
|---|---|
| C = cleaning | C = not FMS |
| F = first cycle flock | M = FMS |
| E = extension flock | |
| R = recycle flock | |
| N = empty | |

For example, a company has 5 farms. The following information has been entered for each farm:
Farm name
A1
B1
C1
D1
E1
No. of hens
9500
10000
10000
10000
10000
Date of flock
Sep. 1, 1997
Sep. 8, 1997
Sep. 15, 1997
Sep. 22, 1997
Sep. 29, 1997

The flock planner may then create a table, shown as Table 4 (FIG. 43) with field name in left column and data type in right. Fmsid=week number, WeeksDate=Date of flock.

The flock planner may then create a table, shown as Table 1 (FIG. 40), which shows the farms as empty for each week. In FIG. 40, columns 1–3, 4–6, 7–9, 10–12 and 13–15 correspond to farms a1, b1, c1, d1 and e1, respectively.

The flock planner may then fill the table, shown as Table 2 (FIG. 41), which the weeks the farms will be cleaned (CC=FMS cleaning, CM=non-FMS cleaning). Farm a1 will be cleaning the week of Sep. 1, 1997, farm b1 the week of Sep. 8, 1997, farm c1 the week of Sep. 15, 1997, and so on.

In Table 3 (FIG. 42) the flock planner has filled in the flocks for each farm. For example, flock 1 on farm a1 will be FC (first cycle) from Sep. 8, 1996–Mar. 9, 1998, will be CC (cleaning) from Mar. 16, 1998–Mar. 30, 1998, on Jul. 6, 1998 it will receive flock 6 as FC.

Figure 37:
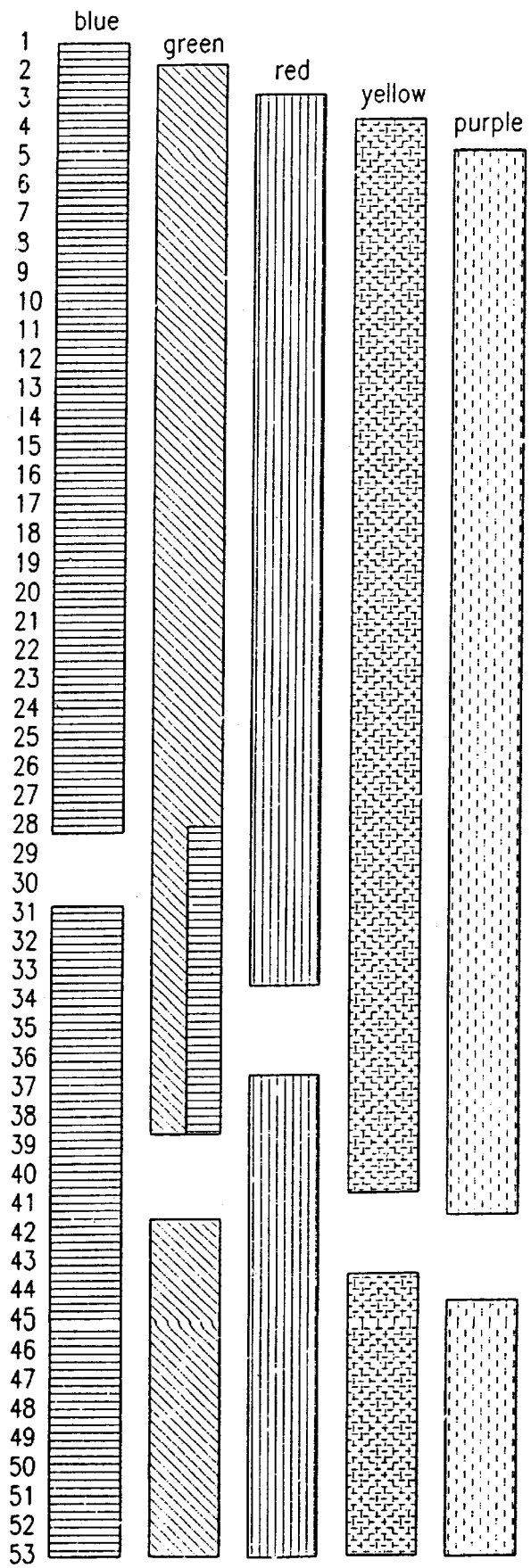
FIG. 37 is a graph of flock planning information which may be generated by the flock planner of FIG. 1.

The flock planner then preferably provides a graphic rendition of the information as shown in FIG. 37.

The modem 50 is typically operative to send and receive files, receive software upgrades, allow technical service from a remote computer into the barn control units 20, and to install an intranet between the breeder manager and all of his farms.

The hand-held terminal 60 records special bird events such as mortality and removal from flock. The hand-held terminal may be downloaded by, for example, connecting the terminal by cable to the central computer. The terminal 60 may for example be based on the IDT302-2 terminal including antenna and charger, commercially available from IDT (Identification Device Technology Ltd.

Figure 26:
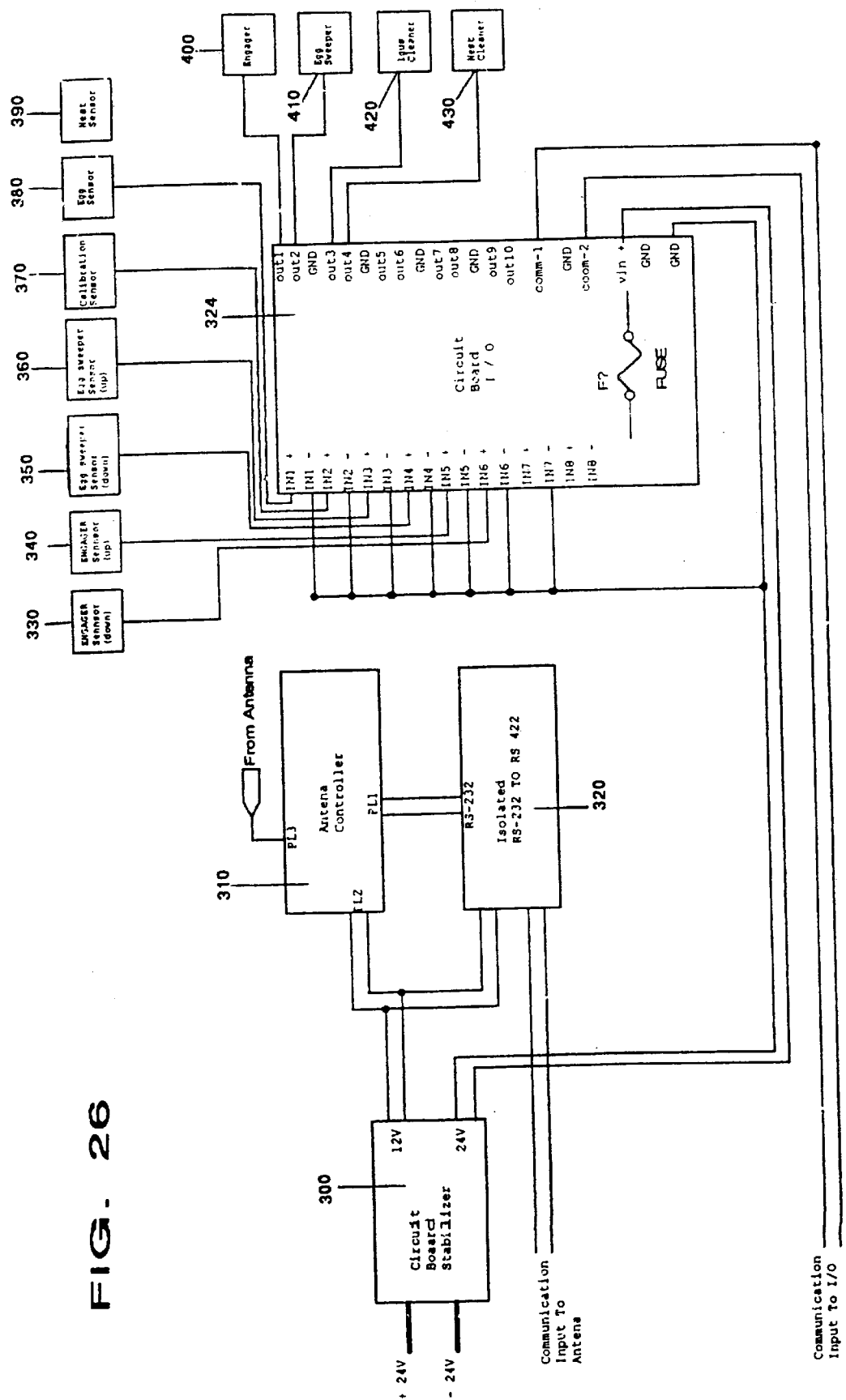
FIG. 26 is a detailed electronic drawing of a preferred implementation of control circuitry for the trolley 70.

Some or all of the following sensors are preferably mounted on the trolley 70 as shown in FIG. 26:
a. An optical egg sensor 380, such as a SICK VT 180-P112 6008787 9737S 12574 available from Erwin Sick Optik-Electronik, Postfach 310, D-7808 Waldkirch, Germany.
b. An optical calibration sensor 370 which may also comprise a SICK VT 180-P112 6008787 9737S 12574 also available from Erwin Sick.
C. A closure indicator 390 such as a SCAN FCM2-1808P-ASU2 available from Scan Electronic Industrial (Thailand) Co., Ltd., 1/3 Moo 5, Rojana Rd. Thumbon, Kan-Harm, Amphur U-Thai, Ayutthaya 13210, Thailand.
d. An edge indicator such as a SCAN FCM1-1808P-ASU2 also available from Scan Electronic Industrial.
e. One or more magnetic piston sensors such as a FESTO #SME-8K-LED-230 available from FESTO, Postfach, D-73726 Esslingen, Germany, for sensing extreme positions of the engager 400 (330 and 340) and of the egg sweeper 410 (350 and 360); and
f. An antenna such an IDT524 controller (310) and antenna, commercially available from IDT, 18-25 Horndean Rd., Forest Park, Bracsknell, Berks, RG12 3XQ, United Kingdom.

Communication via the elements of FIG. 1 may be manual, e.g. output of the central management computer may be generated on diskette and the diskette may be manually transferred to the selection station and to the in-barn control unit. Preferably, however, suitable computer communication is provided.

Figure 17:
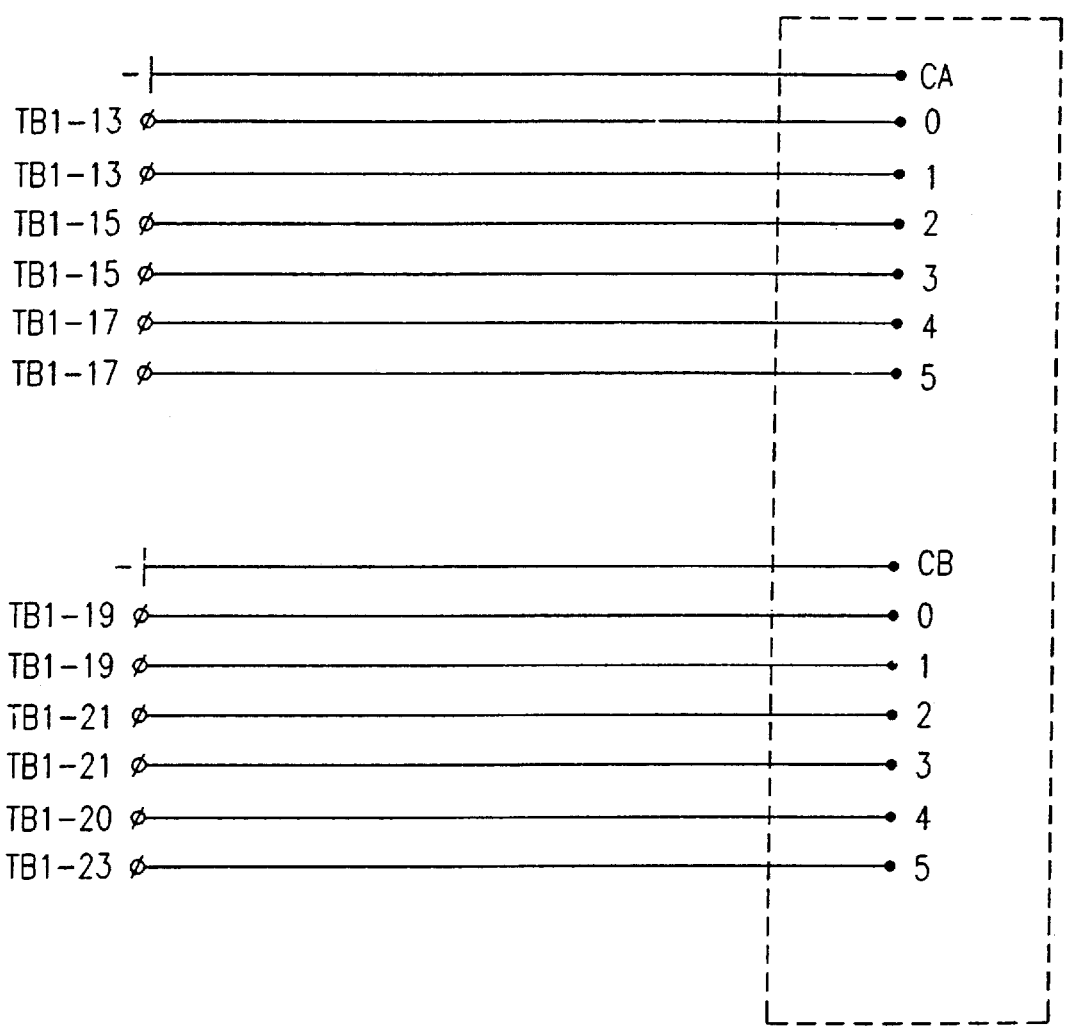
Figure 18:
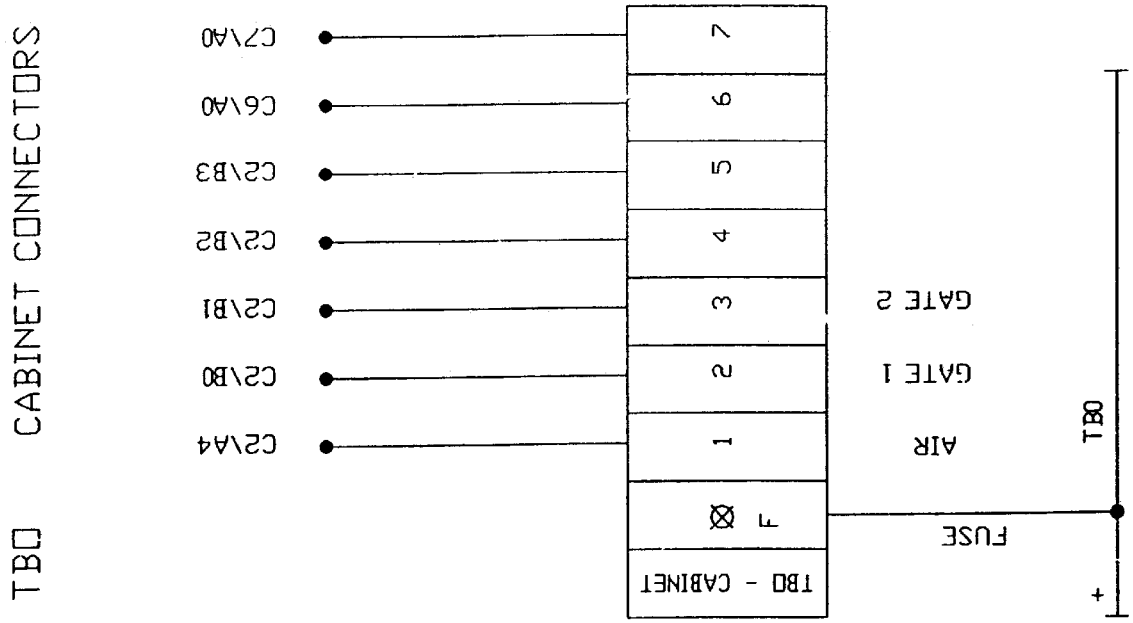
Figure 19:
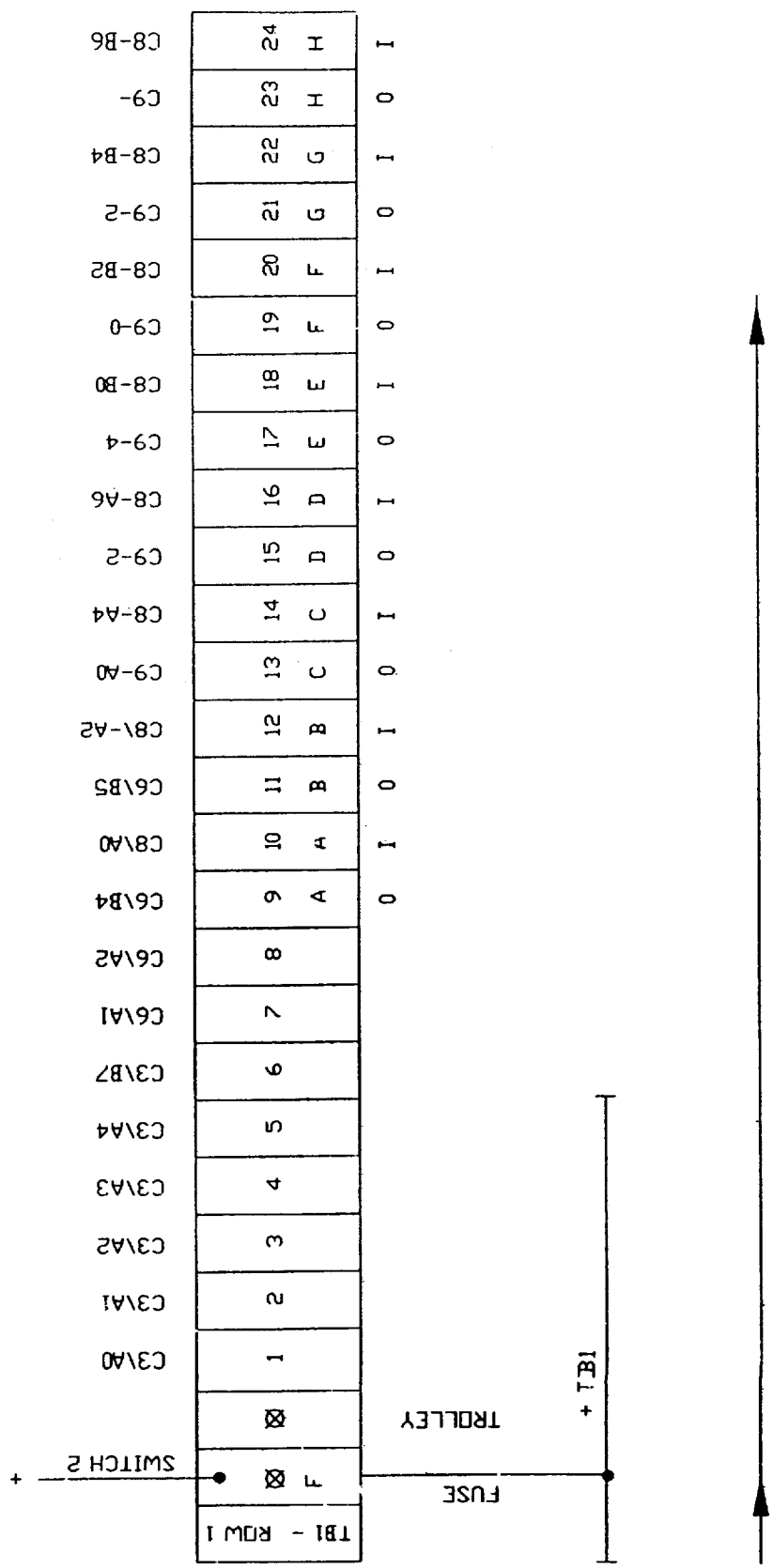
Figure 20:
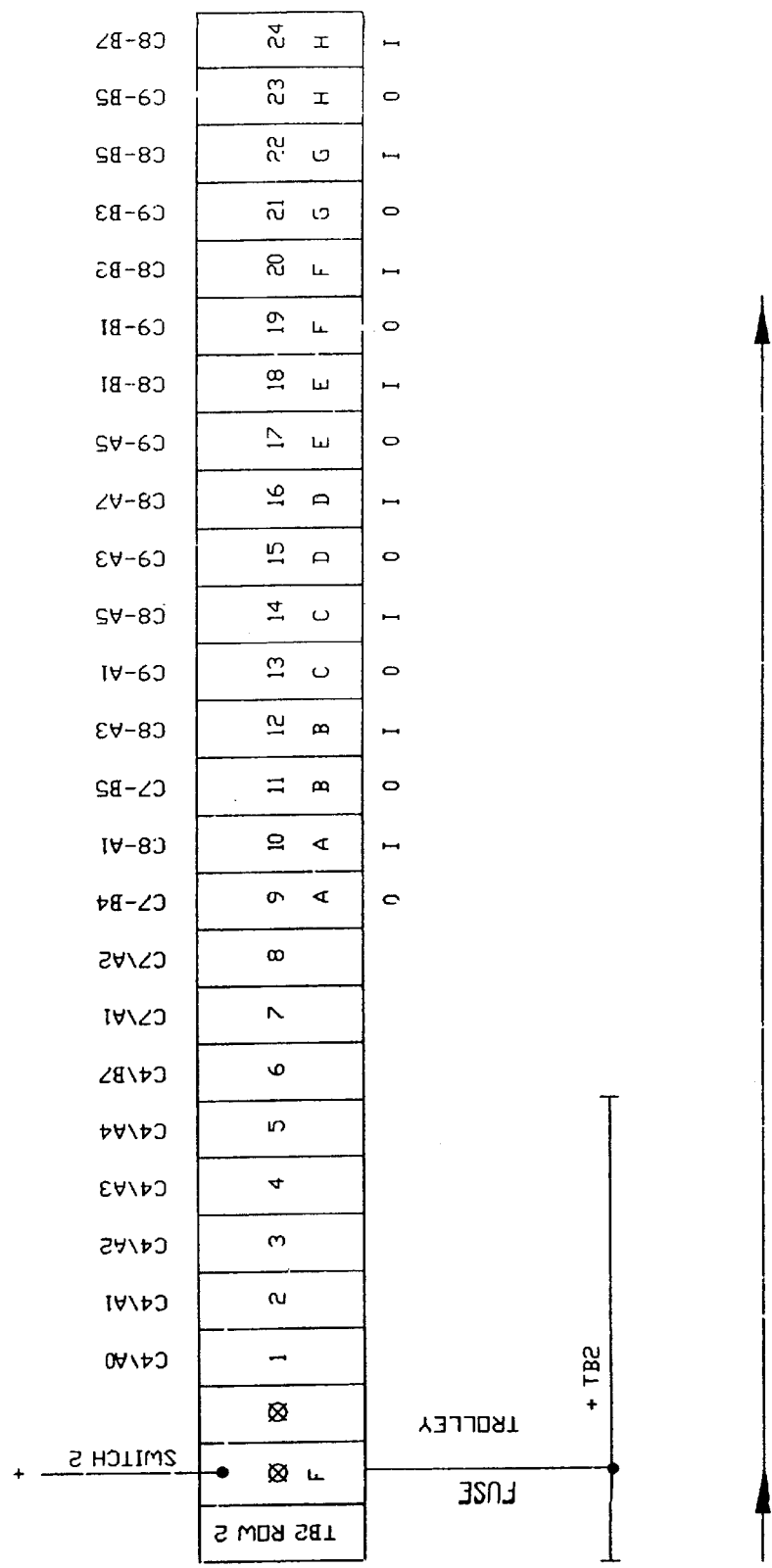
Figure 21:
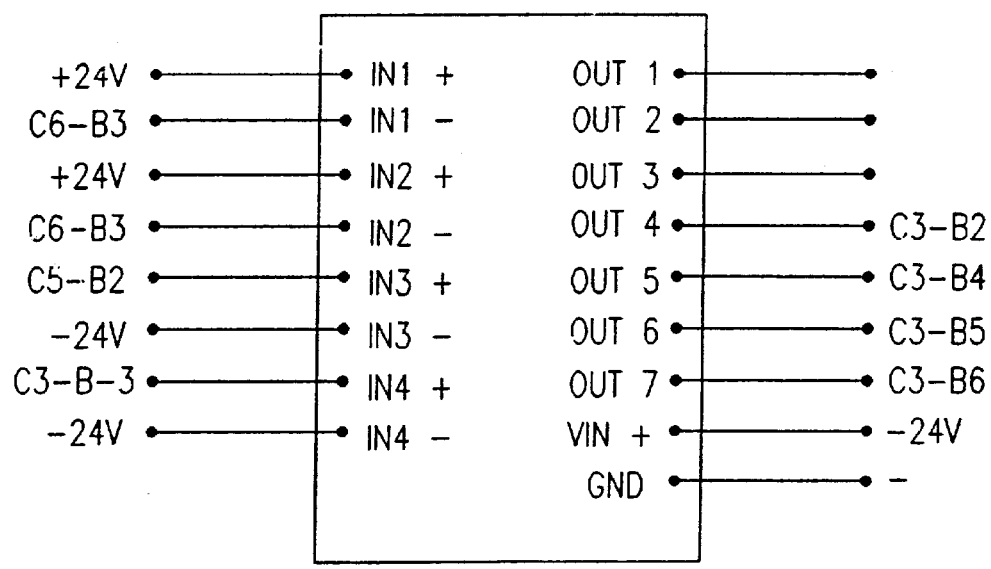
Figure 22:
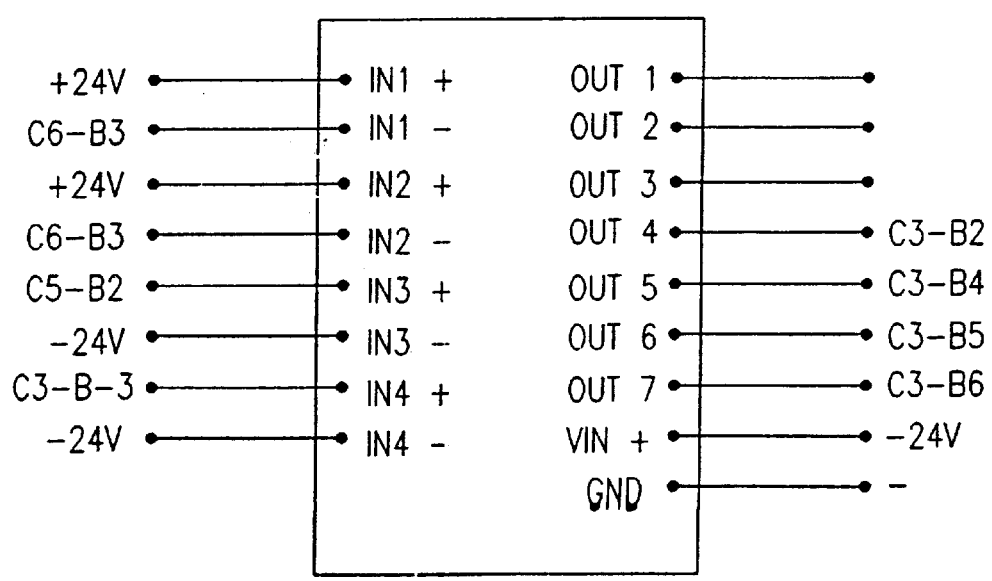

The apparatus of FIG. 1 is useful in conjunction with the hen nesting apparatus described in the above-referenced copending PCT application and particularly the embodiment described in FIGS. 17–18 thereof.

The present invention is also particularly useful in conjunction with the MGH Automated Nesting System, commercially available from /M. G. H. Agricultural Cooperative Society Ltd., Kibbutz Givat Haim Ichud, Israel 38935.

The central management computer is preferably equipped with a modem which allows the central management computer to send and receive files, to receive software upgrades, to obtain technical service from a remote computer into the in-barn control units, and install an intranet between a breeder manager and a plurality of farms under his management.

Figure 4:
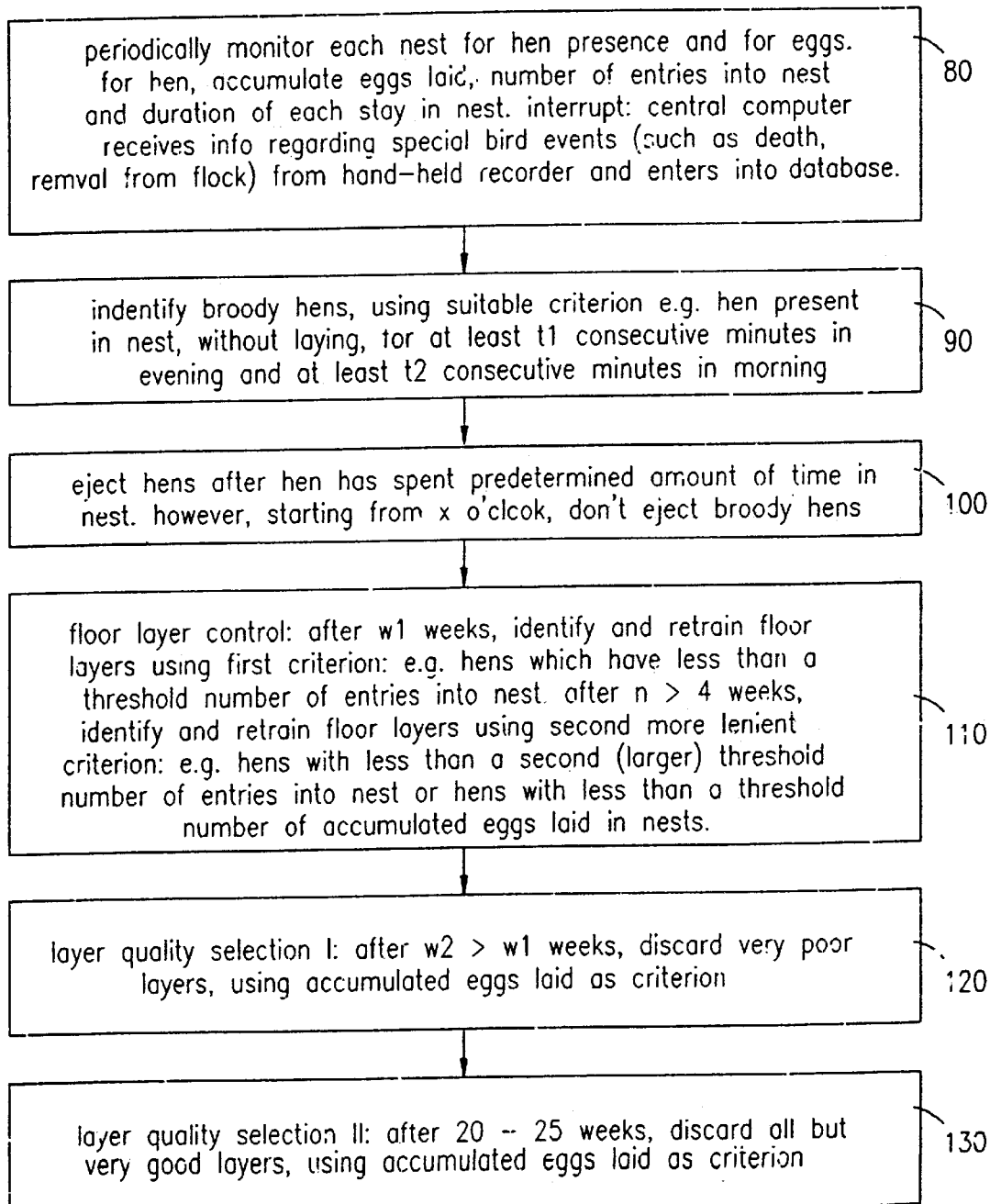
FIG. 4 is a simplified flowchart illustration of a flock control method constructed and operative in accordance with a preferred embodiment of the present invention.

FIG. 4 is a simplified flowchart illustration of a flock control method constructed and operative in accordance with a preferred embodiment of the present invention.

Figure 5:
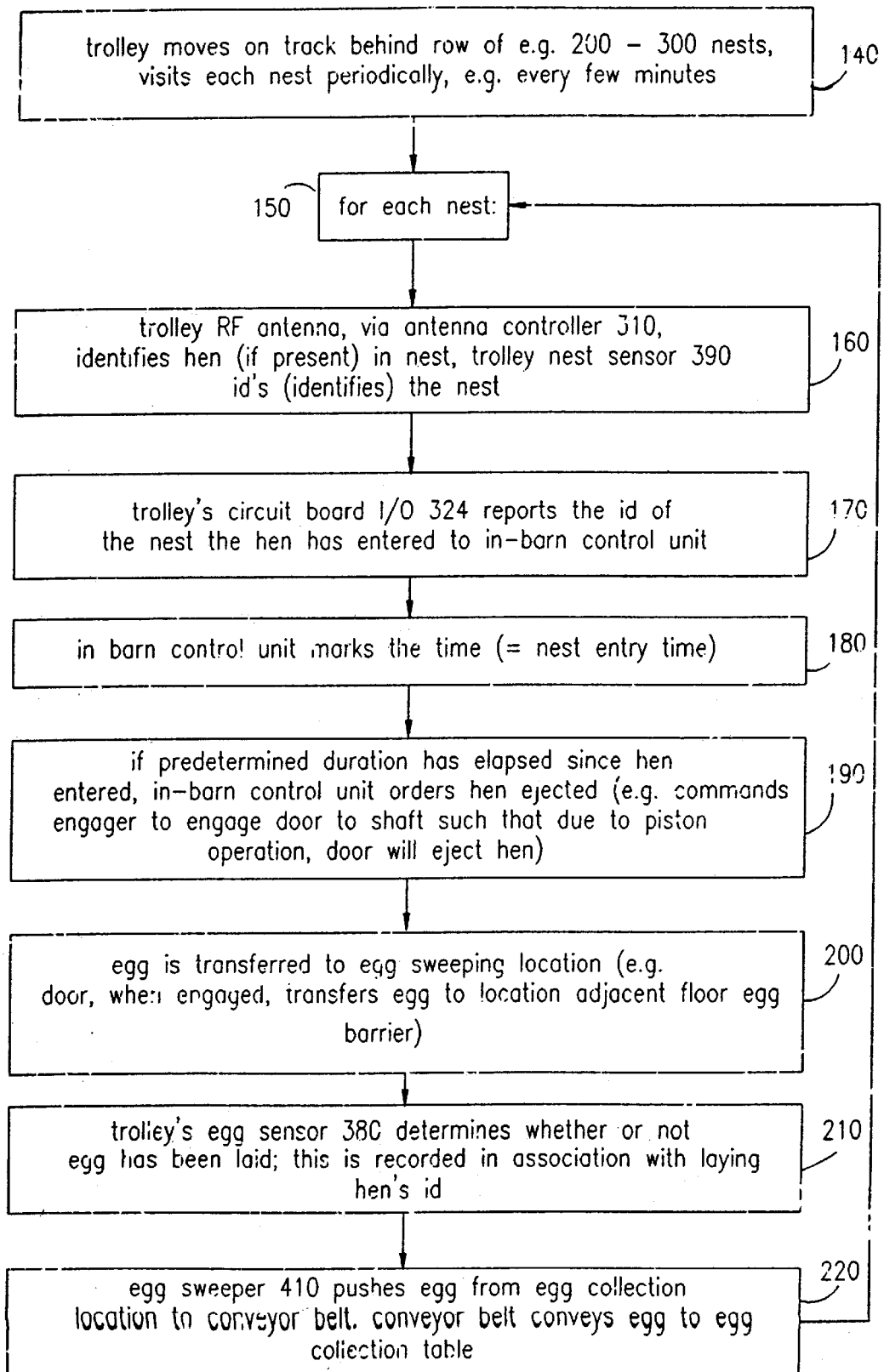
FIG. 5 is a simplified flowchart illustration of the periodic monitoring step of FIG. 4.

FIG. 5 is a simplified flowchart illustration of the periodic monitoring step of FIG. 4.

According to a preferred embodiment of the present invention, sorting of layers is carried out in the course of artificially inseminating the hens, since artificial insemination requires individual handling of the birds. If artificial insemination is manual, the farmer typically receives from the system information regarding the hen he is handling and the farmer then returns the hen to one of a plurality of locations depending on that information.

According to a preferred embodiment of the present invention, commercial meat turkey females are used as parent stock.

The following description describes the economic impact of using commercial meat turkey females as parent stock in a vertically integrated turkey operation. A breeding scheme used by primary breeders to produce and sell breeding stock is outlined and used as the base from which to make comparisons.

Current Breeding Scheme Used by Primary Breeders and the Production Pyramid

Today's commercial Large White turkeys are produced by crossing either two or three pure lines of turkeys. In this context, pure lines refer to populations of turkeys that have been closed for many generations and have usually been selected intensely for different traits. These pure lines are generally referred to as either male line stocks or female line stocks depending upon whether they have been selected more or less intensely for meat or reproductive traits, respectively.

Primary breeders (Hybrid, BUTA, and Nicholas) maintain gene pools (closed populations of specialty stocks), but ultimately rely on only two or three primary commercial lines which they select intensely and then multiply to produce parent stock for sale to the commercial industry. The selection and multiplication of Breeding Parents (BP), multiplication of the pure lines (Great Grandparent and Grandparent generations, i.e. GGP and GP, respectively), and crossing of these lines to produce Parent Stock (PS) and eventually the Final Product (FP) is a process that can take between three and four years. This means that progress made from the intense selection at the BP level can take three to four years before it arrives at the commercial level. This multiplication sequence is often referred to as the production pyramid or "pipeline" and is diagramed in FIG. 33.

When one considers that genetic progress at the BP level can be rather slow and that there can be considerable overlapping of generations between the levels of production in the pyramid, it is easy to see how it could take up to ten years to make significant changes in the performance of the FP. There are strategies that can be used to accelerate the change in performance of the final product (changing the pure lines used at the BP level, better use of BP males for insemination of GGP and GP generations, etc.), but for various reasons (insufficient numbers of birds, geographic distribution of GGP and GP flocks) it may not always be feasible.

Therefore, primary breeders must be extremely aware of how their final product turkey is performing and attempt to anticipate the customers requirements five to ten years in advance. Selection programs at the BP level must be continually adjusted to meet the changing demands of the customer. Failing to correctly anticipate these changes, or not responding quickly enough can have a major impact on final product acceptance and a primary breeders market share.

Basis for Estimating the Performance of Crossbred Turkeys

Primary breeders of turkeys depend primarily upon intense selection pressures and on additive genetic variation to improve the commercial performance of their final product. Selection intensity at the primary breeder level in the Breeding Parent populations is approximately 1% in the males and about 10% in the females. Based on the fecundity of the male line population this is about the biological maximum.

Pedigree selection is done solely in the pure lines at the Breeding Parent level with the hope that improvements will be passed on in a simple additive manner to subsequent generations and ultimately to the crossbred progeny. To date, there is little evidence to suggest that heterosis (hybrid vigor) or over dominance exists in turkeys, even when strains of extreme different phenotypes are crossed. This means that the outcome of a cross between two strains or lines of turkeys can be fairly accurately predicted by adding the mean performance of the two stocks and dividing by two.

For example, if males from strain A have a mean 18 week body weight of 15 kg and strain B males have a mean body weight at 18 weeks of 13 kg, it may be predicted that the male progeny resulting from crossing the two strains (AXB or BXA) will average very close to 14 kg at 18 weeks of age. This is quite accurate for the growth and carcass characteristics of turkeys. Estimates of reproductive traits such as egg production, fertility and hatchability are less accurate because of the low heritability of these traits and the dramatic effect of environment (weather, housing type, body weight control, etc.) on reproductive performance. However, if one takes this into consideration a good estimate of the reproductive performance can be still be made.

Model for Estimating Performance

If the outcome of crossing different populations (strains) of turkeys is accurately predicted by using the concept of additive genetic variation, then it is possible to estimate the economic advantages of using different strains (populations) of turkeys in a crossbreeding program to produce commercial final product (FP) turkeys.

It is assumed that the current breeding scheme used by primary breeders is to use a pure male line strain (i.e. [AXA]) as the parent stock male and a crossbred female line (i.e. [CXD]) as the parent stock female. The males of the [AXA] genotype are crossed with the females of the [CXD] crossbred parent stock genotype to produce a three way crossbred commercial final product (FP) turkey of genotype [(AXA)]X[(CXD)].

Before proceeding under these assumptions, information about the growth rate and feed conversion of the different strains of turkeys to be used is typically gathered. Based on practical experience and reports from the field, a set of growth and feed efficiency tables for toms and hens for various different turkey genotypes was constructed as shown in FIGS. 30–31.

These growth curves and feed efficiency statistics assume that the various strains of turkeys are grown near their genetic potential and on the same nutrient density feeds. A suitable structure such as a quadratic equation (4th order polynomial) was used to describe the growth curves for each respective population. These curves are not highly accurate for body weight from hatch to four weeks of age, but afterwards very closely simulate the bird's natural growth curve.

The tables of FIGS. 30–31 bring together both growth and reproductive statistics about the various turkey genotypes involved in producing the three way cross [(AXA)]X[(CXD)] commercial crossbred final product turkey. These statistics are taken from suitable growth and feed efficiency tables such as those of FIGS. 30–32. In this example it is assumed that the day old PS male line tom is purchased from the primary breeder for $9.00US and the PS hen, after hatching and disposal of the off sex female line toms will have a value of $5.90US. If simple additive genetic variation exists, it is possible to begin to estimate the impact of using the final product commercial female as a breeder to reproduce a subsequent generation of "super commercial turkeys".

Early in 1996 Diamond K Research developed a turkey production simulation model for Hybrid Turkeys. This model assumes that turkeys are produced in a vertically integrated company and that all carcasses are cut up for further processing. The values for both genetic and production traits are shown along with intermediate computations at various stages of production. The final output of the model is net margin per good live pound through the cut up operation.

Using an estimate for all the variables in the model, and the typical mating scheme used to produce commercial turkeys the model suggests that in this operation there is a net margin of $0.0810/pound for toms and $0.0415/pound for hens. In Simulation #2 (super commercial turkey), there is a substitution of the genetic and performance statistics for the commercial turkey hen when used as a parent stock breeder hen. These substituted values are shown as "USER DEFAULT VALUES". Using this scenario the model suggests that net margins for toms and hens of the super commercial turkey would be increased to $0.0876 and $0.0654, respectively.

An important disadvantage for producing the super commercial turkey is in the reproductive performance of the dam (the normal commercial turkey hen). As already mentioned, if only additive genetic variation is assumed for the reproductive traits then the commercial turkey hen as a parent stock breeder hen gives up over 30 eggs per hen housed to the normal parent stock hen. In the simulation model this results in a straight run poult cost of $1.5649 compared to $1.0207 for the normal parent stock hen. A 1.5x value ratio between toms and hens is used and this causes the male poult of the super commercial type to carry a larger load of the dam's reproductive cost.

The table of FIG. 32 estimates the impact of increasing egg production in the dam of the super commercial turkey. It appears that each extra egg per hen housed results in about $0.001/lb improvement in net return on toms and $0.0006/lb on hens. Results may be different depending upon the value assigned to the various reproductive performance and commercial growth traits.

The balance between commercial performance and reproductive performance is quite delicate in the eyes of the Primary Breeder. However, in a totally vertically integrated operation the value of extra growth rate, improved feed conversion and better carcass yield in the final product are so overwhelming that heavier type stocks may be used, in which there is a loss in reproductive performance.

Whether or not commercial final product turkey hens can be used as parent stock breeders depends on a full understanding of the production system in which the product will be used. IT is believed that the use of final product hens as parent stock could improve net margins substantially in an integrated operation.

A missing link in the production of turkey hatching eggs by the final product commercial female is the ability to control her growth rate and reproductive body weight. It is estimated that the egg production of the final product commercial female when used as a parent stock hen could substantially improved by controlling her growth rate and lighting body weight. This female has the potential to weigh about 32 lbs (14.5 kg) at 30 weeks of age compared to about 26 pounds (11.8 kg) for the normal parent stock hen.

Controlling growth rate by physical feed restriction beginning at six weeks of age and lighting these hens at about 30 pounds (13.5 kg) may improve her hen housed egg production by at least 5 eggs and hatchability by 1.5% to 2%. Developing a controlled feeding program for heavy parent stock breeder hens is a believed to be a preferred method for implementing this improvement.

Typically, eggs for the next generation of heavy parent stock hens may be saved from only the top 30% of the population.

While heritability for egg production is quite low (<15%), the method of the present invention provides at least some selection for fitness in the heavier parent stock hens. For example, eggs may be saved for reproduction of the next generation after the 15th week of egg production.

It is believed that about 90% accuracy is obtained if the first 15 weeks of egg production are used from which to perform selection for egg production.

Regarding the percentage of the total number of flocks in a company that can be from meat chicks, this depends upon the level of integration in a company. If processing is a company's primary business it is believed that upwards of 50% of the flocks might come from the "meat chick" type breeder hens.

Regarding the average weight of a meat flock produced from meat chicks, and its economic advantage, it is estimated that commercial males and females produced by the "meat chicks" would average 5%–10% heavier than the normal commercial final product. When slaughtered at the same weight, feed conversions would also be improved by 3% to %5.

Regarding the estimated average laying of a laying flock developed in accordance with the methods of the present invention, it is believed that the "meat chick" derived breeder hens could lay for about 20 weeks. This depends upon how successful body weight control of the females is during their growing cycle.

It is believed that better body weight control of the "meat chicks" during the growing period is advantageous. To achieve this, select "meat chicks" from a population of normal parent stock hens using the LMS system under the criteria mentioned above. These chicks are preferably grown with the next generation of normal parent stock hens and followed through reproduction using the LMS system. Initially, no body weight control is attempted, because the goal is only to determine the impact on egg production. Subsequently, it is preferable to save eggs from the "meat chick" breeders and grow their progeny to evaluate their growth rate, feed conversion and meat yield advantages.

The "meat chick" breeders will produce heavier offspring. To justify the use of this type of management system accurate data may be collected on both egg production, hatchability and carcass characteristics. This is relevant to the issue of how much reproductive performance of the "meat chick" can be improved by controlling her body weight.

The method shown and described herein, which may be integrated with the system shown, illustrated and described herein, has many applications including but not limited to use only internally to produce poults for processing, for selling "heavier" parent stock to producers, or selling the concept via the LMS system to existing commercial breeders). Health issues about the "meat chick" generation are preferably taken into consideration as there may be no break between the primary breeder and the parent stock generation.

Getting consistent reproduction from the "meat chick" generation is important. Preferably, the method includes automatically segregating flocks based on body weight whenever they are handled for vaccination, debeaking, etc. This allows managers to better manage the growth potential of the "meat chick" breeder hens and improve egg production performance.

J. Does use of the method result in some very small birds too?

Using "teat chicks" as breeders may increase the variability in the commercial offspring somewhat, but not noticeably. Because the offspring of the "meat chick" breeders will be heavier it is expected that growing mortality, leg problems, and condemnations in the processing plant will be somewhat increased. The offspring of the "meat chicks" are more closely related to the male line (75% of their genes come from the male line) and it is expected to see more of these types of problems and greater genotype by environment interactions.

FIG. 33 is a pictorial illustration of a turkey production pyramid showing generations of fowl. Each level is a generation which takes about one year to develop. The top 3 levels are primary breeder levels whereas the bottom two levels are integrator levels. BP stands for Breed Parents, GGP is great grand-parents, GP is grandparents, PS is parent stock, and FP is final product (i.e. meat-producing flocks).

FIG. 34 is a heritability diagram showing that heritability in turkeys is largely additive. In FIG. 34, A>B and the inherited trait is body weight.

Figure 35:
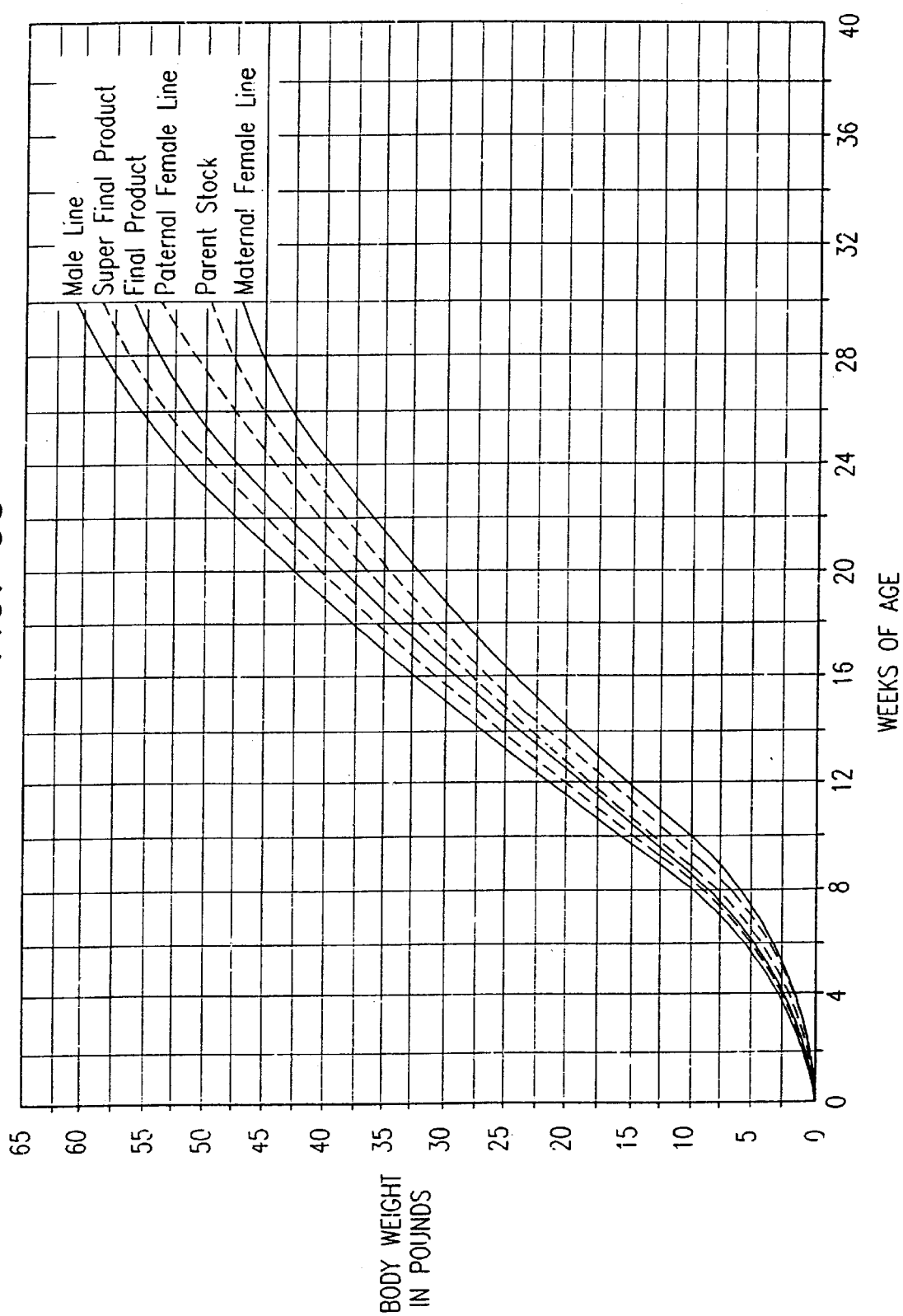
FIG. 35 is a graph of estimated growth curves for tom fowl showing body weight in pounds as a function of weeks of age.

FIG. 35 is a graph of estimated growth curves for tom fowl showing body weight in pounds as a function of weeks of age.

A preferred embodiment of the present invention is now described with reference to Appendices A–E.

Figure 8:
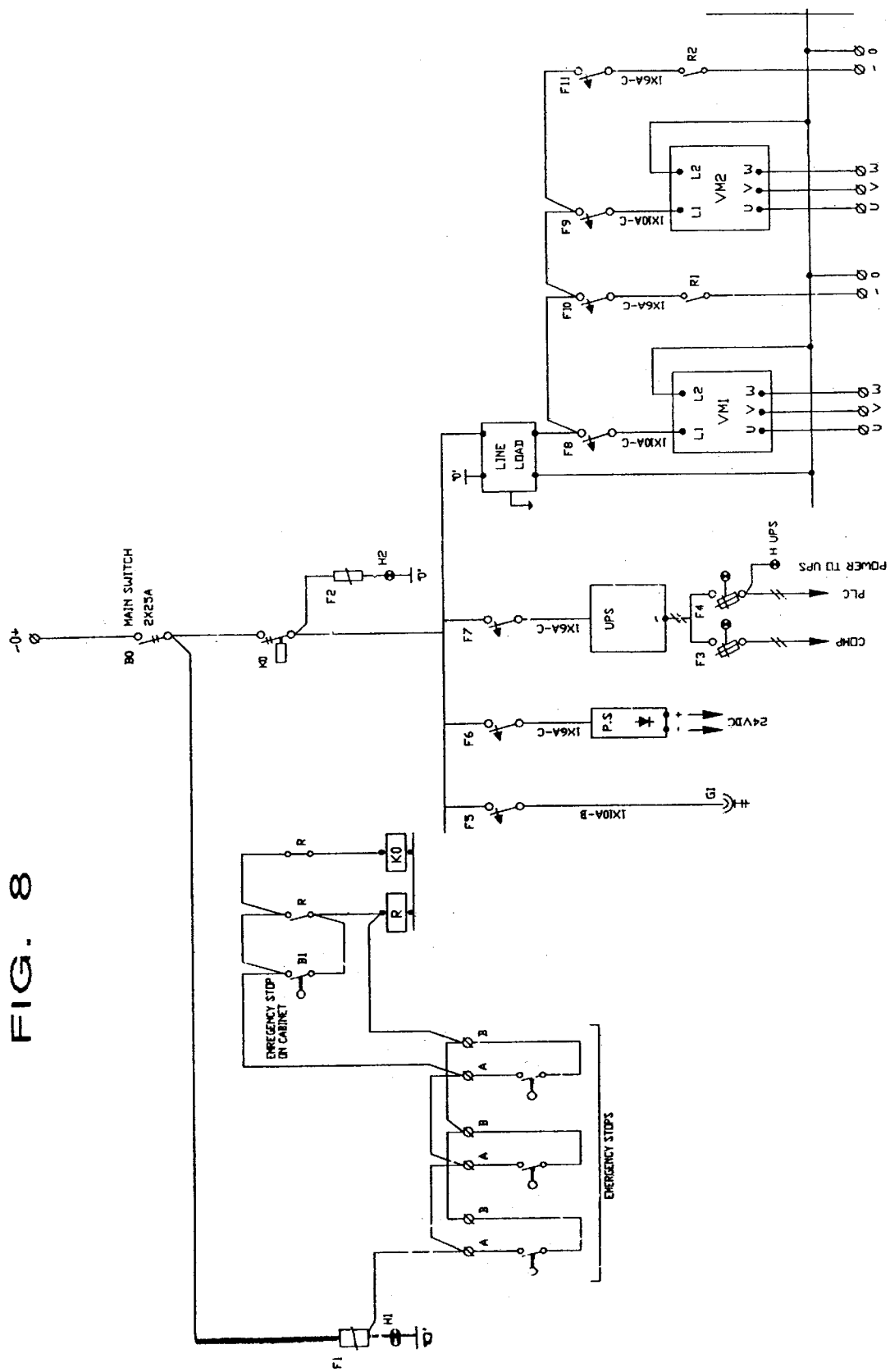
Figure 9:
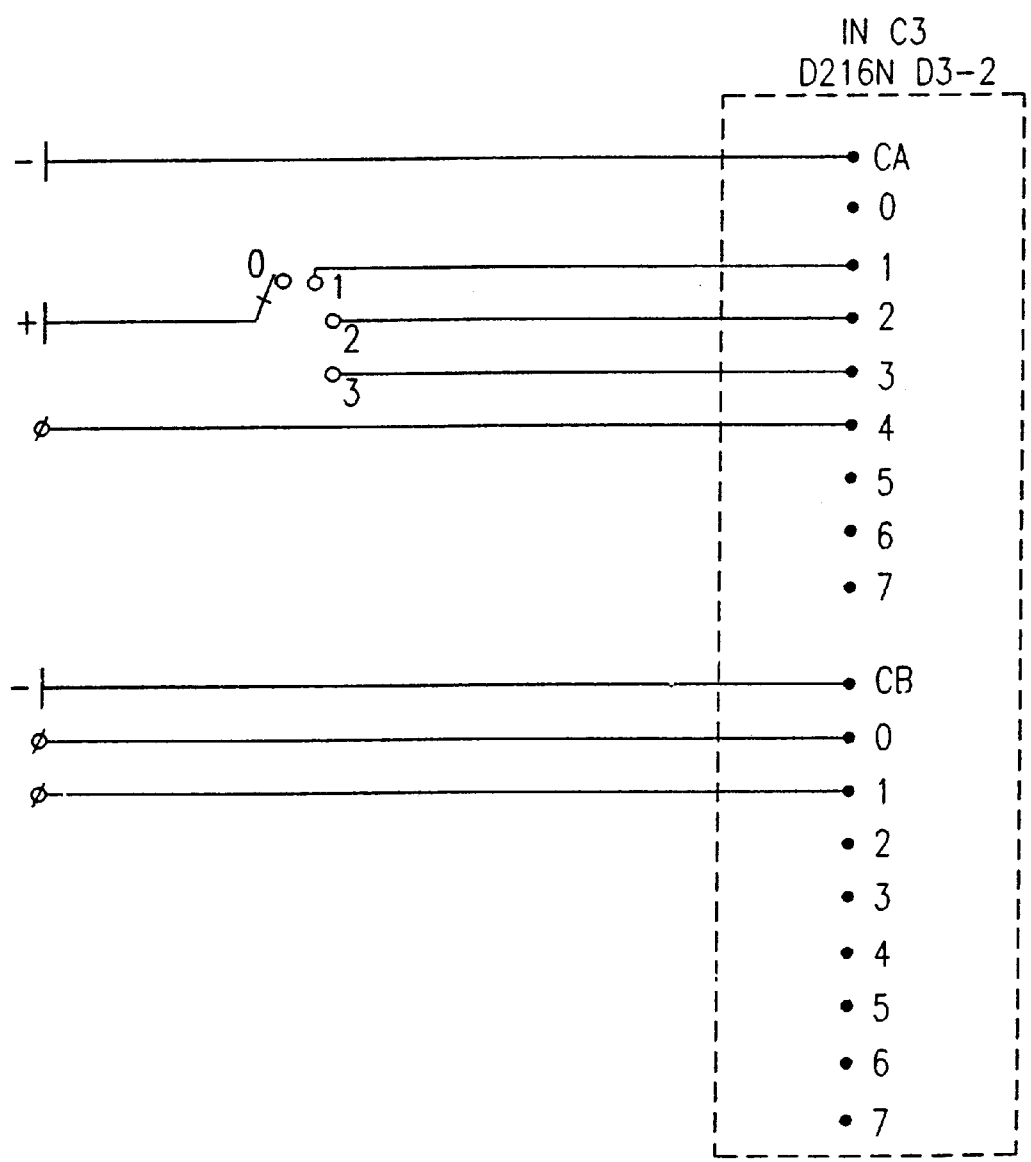
Figure 10:
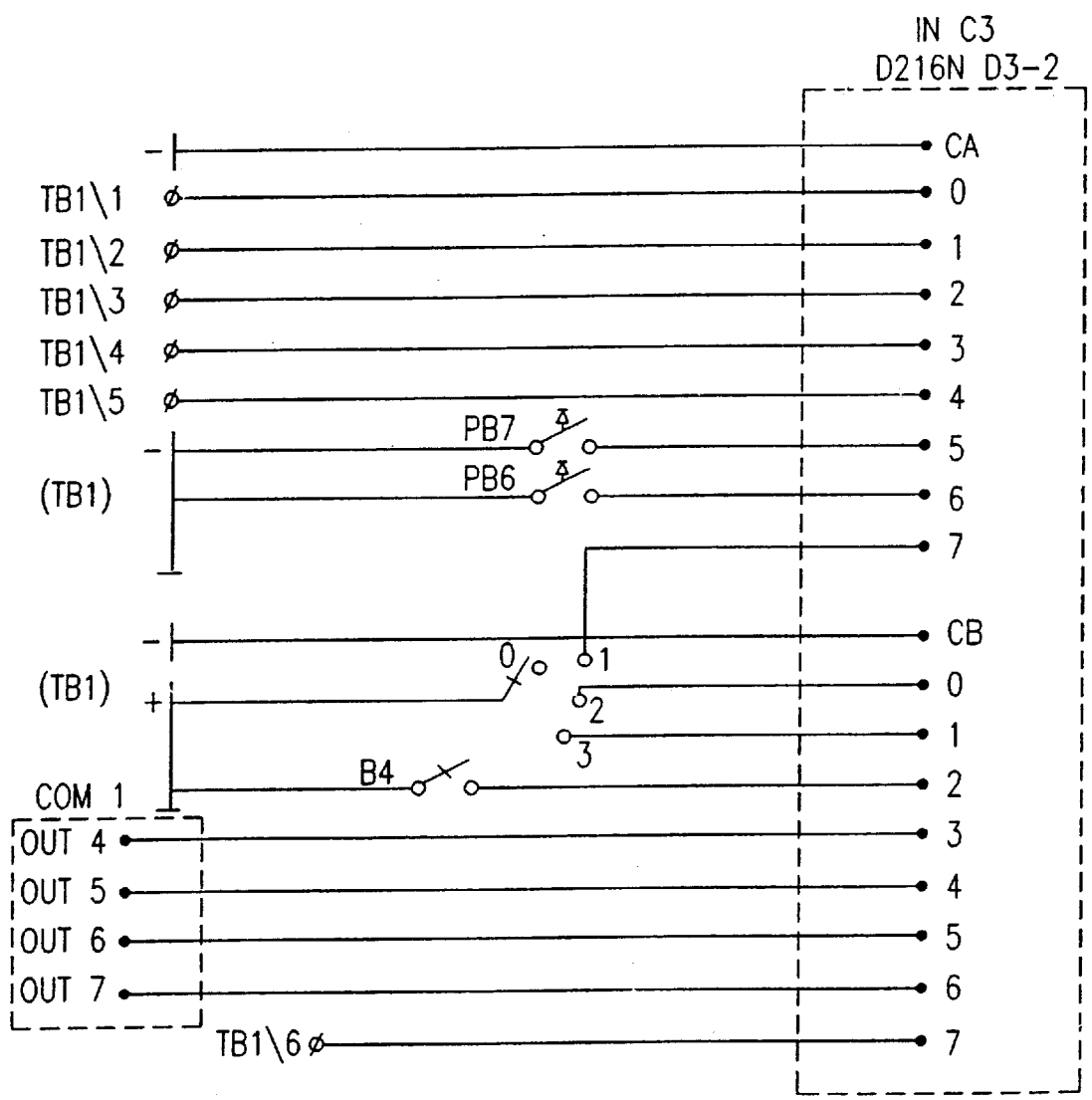
Figure 11:
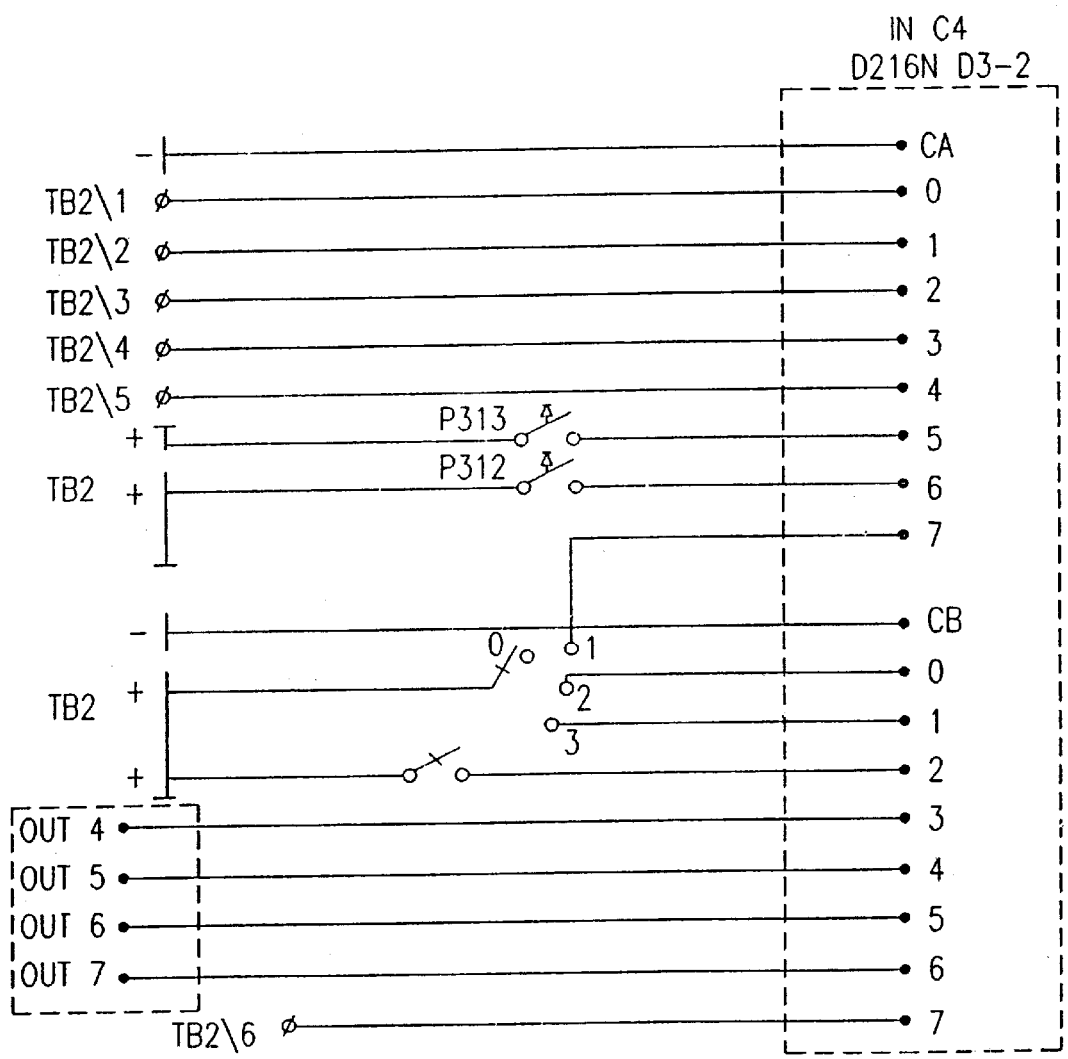
Figure 12:
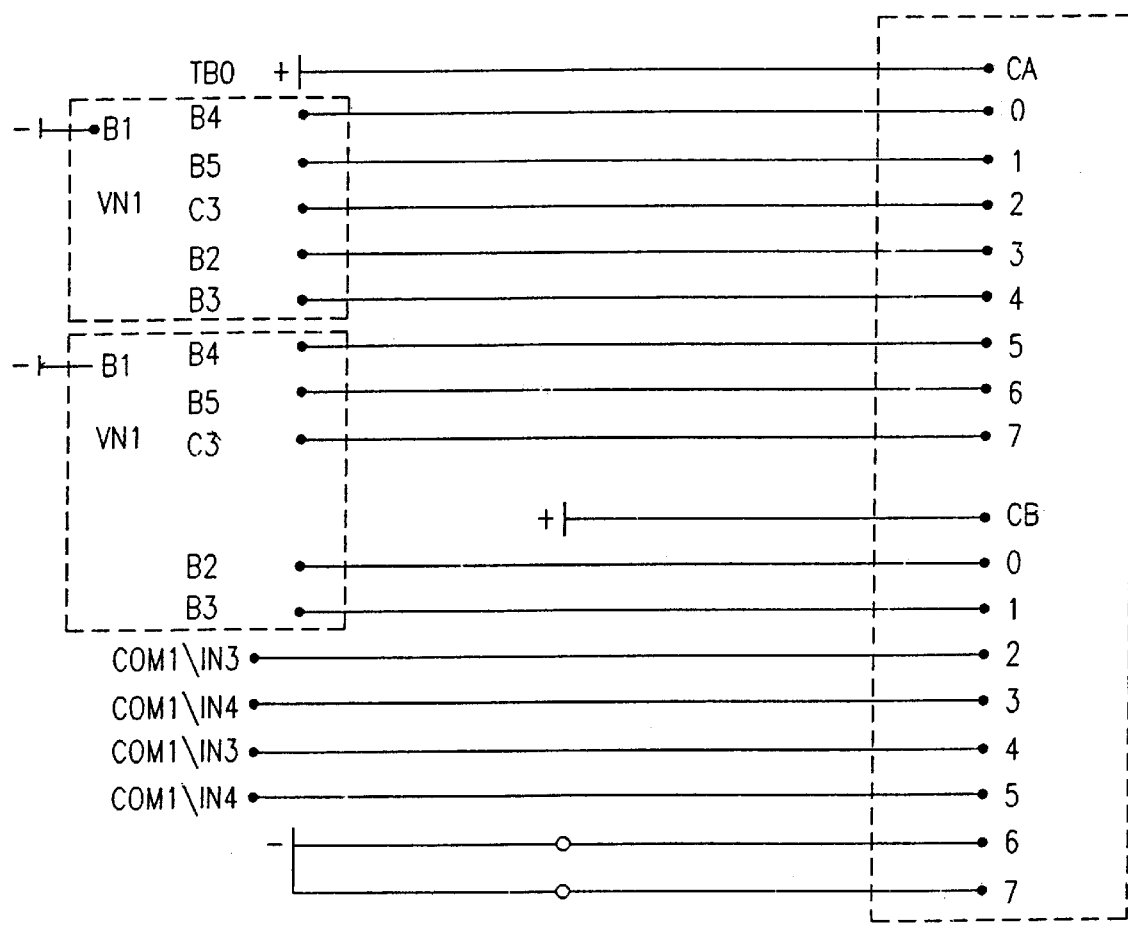
Figure 13:
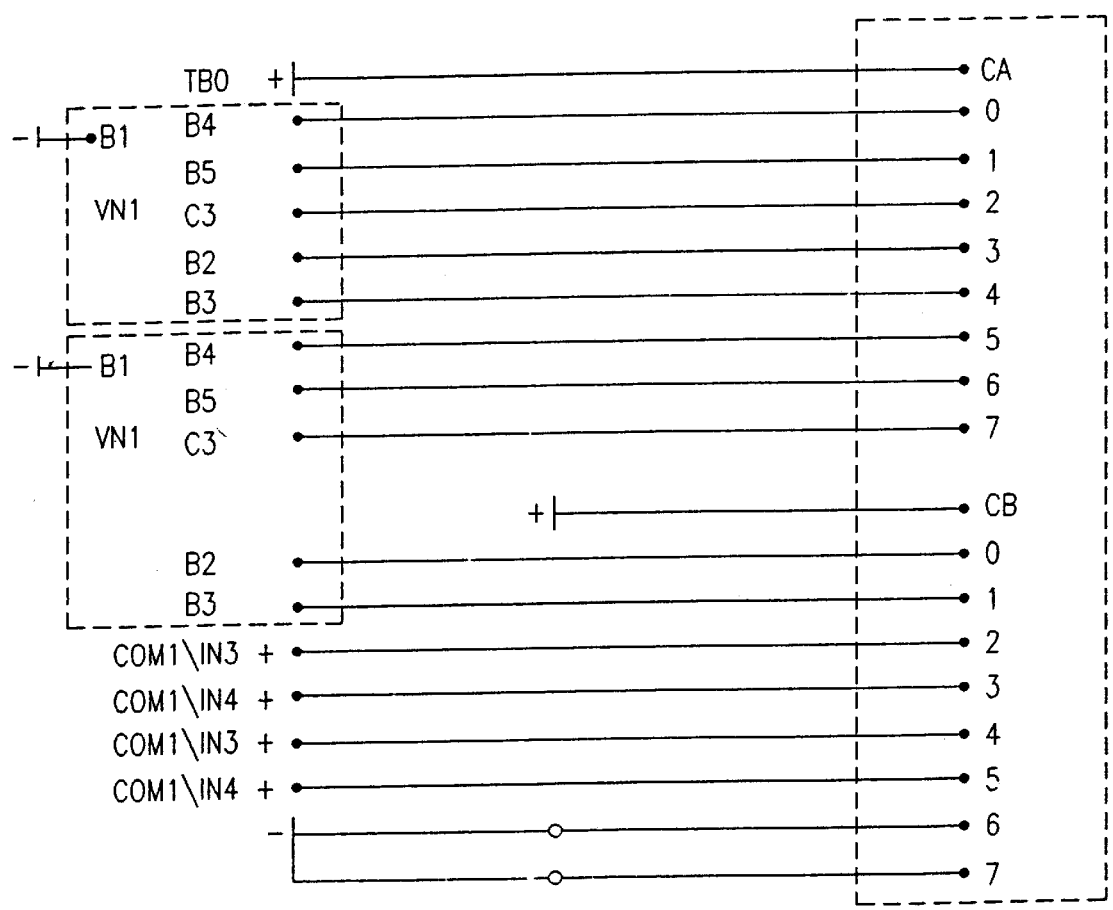
Figure 14:
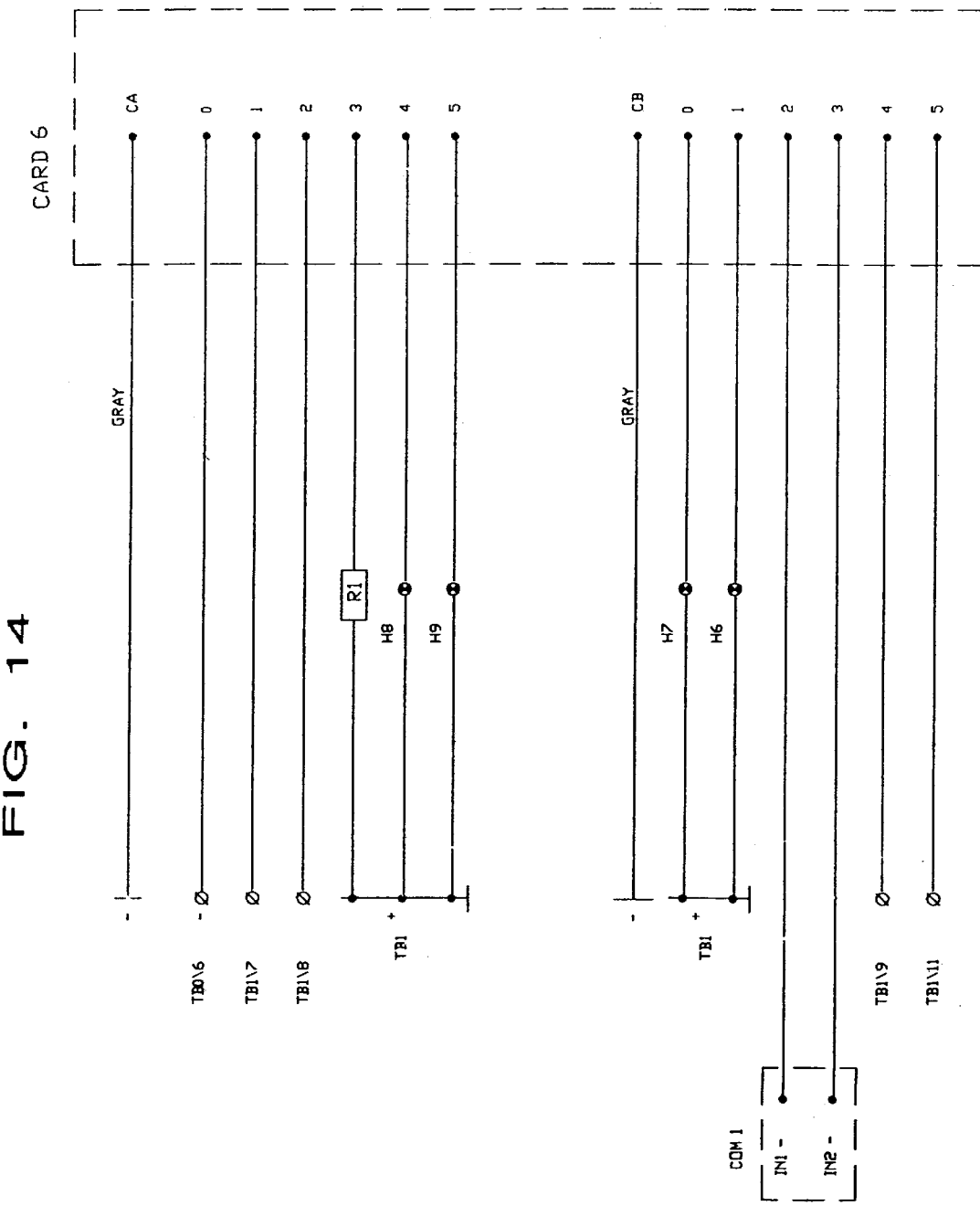
Figure 15:
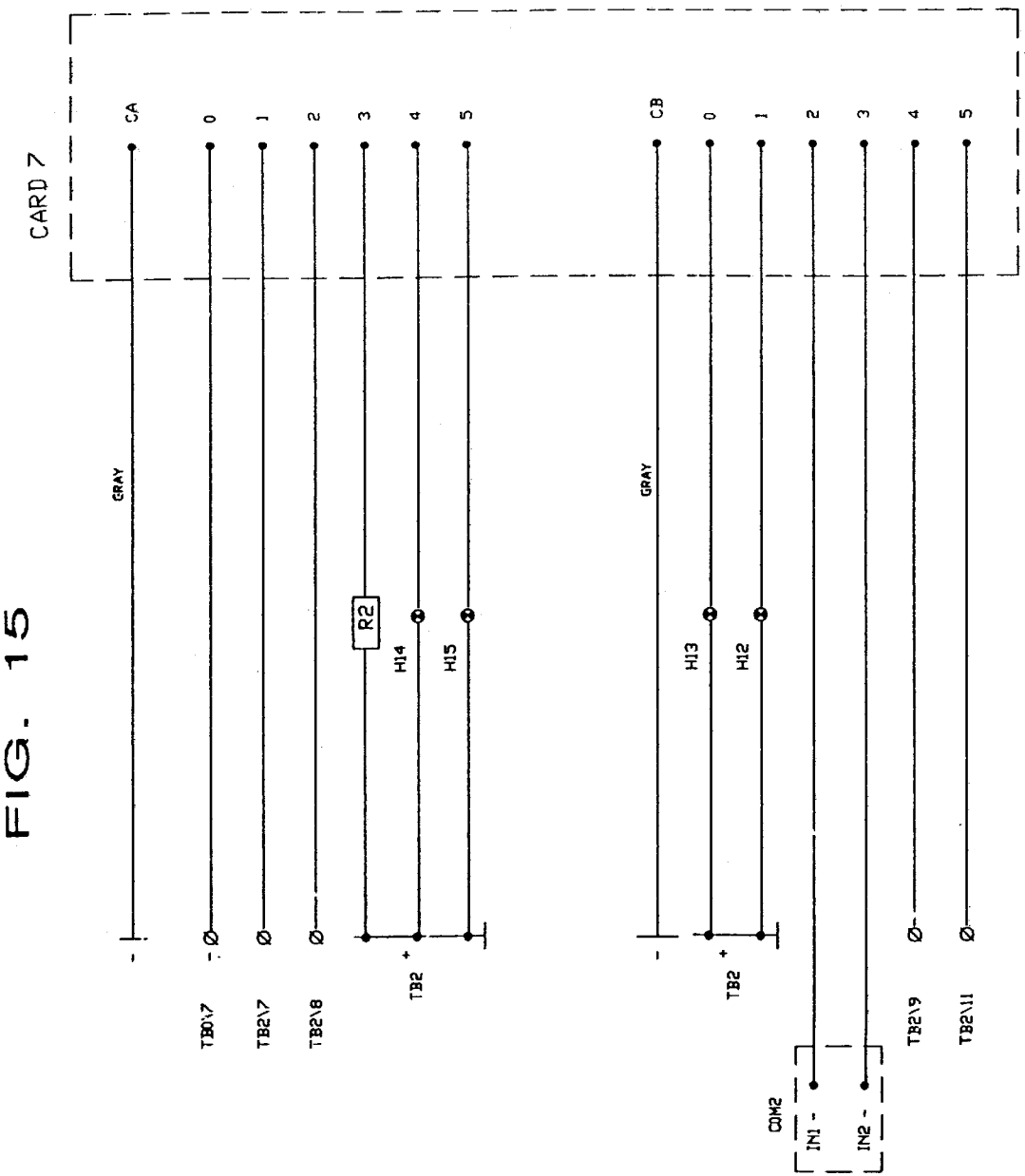
Figure 16:
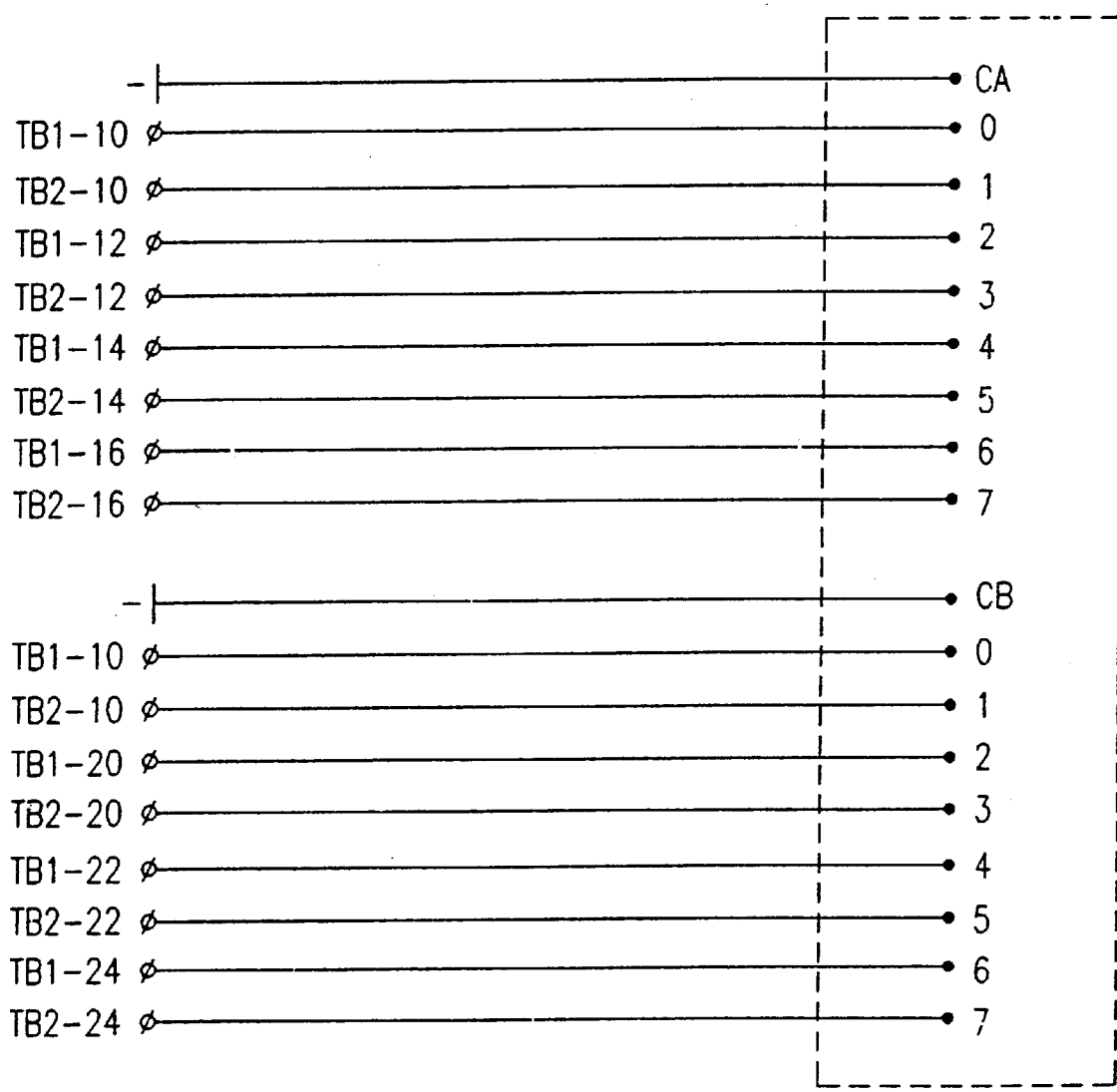

To generate a turkey layer management system according to a preferred embodiment of the present invention, the following steps may be performed:

a. Generate a digital file from the listing of Appendix A in the memory of a suitable computer, such as a PC, functioning as a central management computer 10 in FIG. 1.

b. Generate a digital file from the listing of Appendix B in the unit referenced "comp" (FIG. 8) in the in-barn control unit 20. Use the program of Appendix D to convert the resulting hexadecimal file into a runnable file.

c. Generate a digital file from the listing of Appendix C and load onto the control and power electronic card in the selection station 30 (FIG. 25). Use the program of Appendix D to convert the resulting hexadecimal file into a runnable file.

d. Use the above software units and other units described herein in conjunction with the hen nesting apparatus described in the above-referenced copending PCT application or in conjunction with MGH's Automated Nesting System, commercially available from M.G.H. Agricultural Cooperative Society Ltd., Kibbutz Givat Haim Ichud, Israel 38935.

e. To operate the flock planner 40 of FIG. 1, generate a digital file from the listing of Appendix E in the memory of a suitable computer such as a PC. Use the program of Appendix D to convert the resulting hexadecimal file into a runnable file.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A layer flock management system comprising:

an electronic layer information accumulator for automatically accumulating laying data and nesting behavior information regarding each of a multiplicity of layers in a flock; and an electronic floor layer identifier for automatically identifying floor layers from among said multiplicity of layers.

2. A layer flock management system comprising:

an electronic layer information accumulator for automatically accumulating laying data and nesting behavior information regarding each of a multiplicity of layers in a flock; and an electronic broody hen identifier for automatically identifying broody hens from among said multiplicity of layers.

3. A method for layer flock management comprising:

automatically accumulating laying data and nesting behavior information regarding each of a multiplicity of layers in a flock; whereby upon presentation of a said layer, automatically recognizing said layer and presenting said laying data and nesting behavior information regarding said layer to a farmer handling said layer.

4. The method according to claim 3 further comprising:

discarding some of said multiplicity of layers from said flock, based on said laying data and nesting behavior information.

5. The method according to claim 4, wherein said laying data and nesting behavior information comprises a layer quality score.

6. A method for layer flock management so as to enhance egg production in a given facility, the method comprising:

automatically monitoring laying performance of each layer in a plurality of flocks, each flock comprising a multiplicity of layers;

based on a result of the monitoring, selecting best layers in each flock; and combining the best layers into new flocks, removing all layers except the best layers and filling the facility by introducing new layers.

7. A method according to claim 6 wherein said combining step comprises automatically generating a combination schedule for combining the best layers into new flocks.

8. A layer flock management method comprising:

automatically accumulating laying data and nesting behavior information regarding each of a multiplicity of layers in a flock; and automatically identifying floor layers from among said multiplicity of layers.

9. A layer flock management method comprising:

automatically accumulating laying data and nesting behavior information regarding each of a multiplicity of layers in a flock; and automatically identifying broody hens from among said multiplicity of layers.

10. A system for layer flock management comprising:

an electronic layer information accumulator for automatically accumulating laying data and nesting behavior information regarding each of a multiplicity of layers in a flock; and an electronic layer information presenter, whereby upon presentation of a said layer, automatically recognizing said layer and presenting said laying data and nesting behavior information regarding said layer to a farmer handling said layer.

11. The system according to claim 10, wherein said laying data and nesting behavior information comprises a layer quality score.

12. A system for layer flock management so as to enhance egg production in a given facility, the system comprising:

a layer performance monitor operative to automatically monitor laying performance of each layer in a plurality of flocks, each flock comprising a multiplicity of layers;

a best layer selector operative, based on a result of the monitoring, to select best layers in each flock; and a flock planner operative to combine the best layers into new flocks, removing all layers except the best layers and filling the facility by introducing new layers.

13. A system according to claim 12 wherein said flock planner is operative to automatically generate a combination schedule for combining the best layers into new flocks.

* * * * *